US009818228B2

(12) United States Patent
Lanier et al.

(10) Patent No.: US 9,818,228 B2
(45) Date of Patent: Nov. 14, 2017

(54) MIXED REALITY SOCIAL INTERACTION

(71) Applicant: Microsoft Technology Licensing, LLC, Redmond, WA (US)

(72) Inventors: Jaron Lanier, Berkeley, CA (US); Ran Gal, Redmond, WA (US); Wayne Chang, Bellevue, WA (US); Javier Arturo Porras Luraschi, Redmond, WA (US); Viktor A. Mateevitsi, Chicago, IL (US); Gheric Speiginer, Marietta, GA (US); Joseph Menke, Berkeley, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/171,964

(22) Filed: Jun. 2, 2016

(65) Prior Publication Data
US 2017/0039770 A1  Feb. 9, 2017

Related U.S. Application Data

(60) Provisional application No. 62/202,614, filed on Aug. 7, 2015.

(51) Int. Cl.
  G06T 19/00 (2011.01)
  H04W 4/04 (2009.01)
(52) U.S. Cl.
  CPC ........... G06T 19/006 (2013.01); H04W 4/043 (2013.01)
(58) Field of Classification Search
  CPC .............................. G06T 19/006; G06T 19/00
  See application file for complete search history.

(56) References Cited

U.S. PATENT DOCUMENTS

| 5,189,463 A | 2/1993 | Capper et al. |
| 7,039,676 B1 | 5/2006 | Day et al. |

(Continued)

FOREIGN PATENT DOCUMENTS

| CN | 103941861 | 7/2014 |
| KR | 20140001167 | 1/2014 |
| KR | 20140010616 | 1/2014 |

OTHER PUBLICATIONS

Office Action for U.S. Appl. No. 14/821,505, dated Feb. 10, 2017, Lanier et al., "Mixed Reality Social nteractions", 27 pgs.
(Continued)

*Primary Examiner* — Thomas Lett
(74) *Attorney, Agent, or Firm* — Schwegman Lundberg & Woessner, P.A.

(57) ABSTRACT

Mixed reality social interactions are described. Techniques described herein include determining authentication information associated with a mixed reality display device and determining that a content item is visible in a mixed reality environment associated with the mixed reality display device. In an example, a content item may be determined to be visible based at least in part on content data indicating that the content item is owned by the mixed reality display device and/or has been shared with the mixed reality display device. The content data may also indicate an identification of a content item of the plurality of content items, an owner of the content item, and permissions associated with the content item. The techniques further describe causing a graphical representation of the content item to be presented via a display on the mixed reality display device.

20 Claims, 12 Drawing Sheets

(56) References Cited

U.S. PATENT DOCUMENTS

| | | | |
|---|---|---|---|
| 7,626,569 | B2 | 12/2009 | Lanier |
| 7,725,547 | B2 | 5/2010 | Albertson et al. |
| 8,231,465 | B2 | 7/2012 | Yee et al. |
| 8,421,823 | B2 | 4/2013 | Nishikawa |
| 8,520,027 | B2 | 8/2013 | Itkowitz et al. |
| 8,612,363 | B2 | 12/2013 | Karkanias et al. |
| 8,687,021 | B2 | 4/2014 | Bathiche et al. |
| 9,007,473 | B1* | 4/2015 | Worley, III ........ H04N 21/2347 348/211.11 |
| 9,063,566 | B2 | 6/2015 | McCulloch et al. |
| 2005/0148828 | A1 | 7/2005 | Lindsay |
| 2008/0001951 | A1 | 1/2008 | Marks et al. |
| 2010/0020083 | A1 | 1/2010 | Kumakura et al. |
| 2010/0103196 | A1* | 4/2010 | Kumar ..................... G06F 3/012 345/633 |
| 2010/0146395 | A1 | 6/2010 | Reyes et al. |
| 2010/0253700 | A1 | 10/2010 | Bergeron |
| 2012/0069028 | A1 | 3/2012 | Bouguerra |
| 2013/0044129 | A1 | 2/2013 | Latta et al. |
| 2013/0044130 | A1 | 2/2013 | Geisner et al. |
| 2013/0093788 | A1 | 4/2013 | Liu et al. |
| 2013/0120372 | A1 | 5/2013 | Lee et al. |
| 2013/0147788 | A1 | 6/2013 | Weise et al. |
| 2013/0155105 | A1 | 6/2013 | Boldyrev et al. |
| 2013/0169682 | A1 | 7/2013 | Novak et al. |
| 2013/0174213 | A1 | 7/2013 | Liu et al. |
| 2013/0293468 | A1 | 11/2013 | Perez et al. |
| 2013/0307875 | A1 | 11/2013 | Anderson |
| 2013/0342564 | A1 | 12/2013 | Kinnebrew et al. |
| 2013/0342636 | A1 | 12/2013 | Tian |
| 2014/0002492 | A1 | 1/2014 | Lamb et al. |
| 2014/0082520 | A1 | 3/2014 | Mamoun |
| 2014/0160001 | A1 | 6/2014 | Kinnebrew et al. |
| 2014/0204077 | A1 | 7/2014 | Kamuda et al. |
| 2014/0226900 | A1 | 8/2014 | Saban et al. |
| 2014/0240351 | A1 | 8/2014 | Scavezze et al. |
| 2014/0354685 | A1 | 12/2014 | Lazarow et al. |
| 2014/0359085 | A1 | 12/2014 | Chen |
| 2014/0368537 | A1 | 12/2014 | Salter et al. |
| 2015/0104061 | A1 | 4/2015 | Heikkinen et al. |
| 2015/0153912 | A1 | 6/2015 | Reily et al. |
| 2015/0244699 | A1* | 8/2015 | Hessler ................. H04W 12/06 726/7 |
| 2017/0038829 | A1 | 2/2017 | Lanier et al. |
| 2017/0039986 | A1 | 2/2017 | Lanier et al. |

OTHER PUBLICATIONS

"Augmented Reality in Education", In Proceedings of the "Science Center to Go" Workshops, Oct. 27, 2011, 86 pages.

Ballagas, et al., "Family communication phone conversations with children", In Proceedings of the 8th International Conference on Interaction Design and Children, Jun. 3, 2009, pp. 321-324.

Billinghurst, et al., "Collaborative Mixed Reality", In Proceedings of the International Symposium on Mixed Reality, Mar. 19, 1999, 14 pages.

Branscombe, Mary, "Microsoft HoloLens Is a World-Changing Mixed Reality Product", Retrieved on: Jul. 31, 2015, Available at: http://www.in.techradar.com/reviews/wearables/Microsoft-HoloLens/articleshow/45992974.cms, 9 pages.

Canon Technology, "Searching for Seeds of Technology Research in Pre-Competitive Areas", retrieved on Aug. 3, 2015, available at <<http://www.canon.com/technology/approach/special/pre.html>>, May 7, 2013, 3 pages.

Chan, "What the World Would Look Like If You Could Actually See Wi-Fi Signals", available at: <<http://gizmodo.com/what-the-world-would-look-like-if-you-could-actually-se-846030448>>, Jul. 30, 2013, 10 pages.

"Collaborative Mixed Reality", Published on: Oct. 12, 2014, Available at: https://web.cs.dal.ca/~reilly/inspace.html, 3 pages.

Dias, et al., "Image Manipulation through Gestures", In Proceedings of Advances in Computer Graphics, Nov. 2004, 9 pages.

Dove, Jackie, "Personify lets you Video Chat, Watch Movies or Play Games in an Immersive 3D Virtual Space", Published on: Jan. 13, 2015, Available at: http://thenextweb.com/apps/2015/01/13/personify-lets-video-chat-watch-movies-play-games-immersive-3d-virtual-space/ 8 pages.

"Holographic Computing is here", Retrieved on: Jul. 28, 2015 Available at: https://www.microsoft.com/microsoft-hololens/en-us, 8 pages.

Jung, et al., "Touched by the storyteller the influence of remote touch in the context of storytelling", In Proceedings of Humaine Association Conference on Affective Computing and Intelligent Interaction, Sep. 2, 2013, pp. 792-797.

Kadav, et al., "Improving the Online Video Chat Experience", In Proceedings of International Conference on Ergonomics and Health Aspects of Work with Computers as Part of Human-Computer Interaction, Jul. 9, 2011, 2 pages.

Kunert, et al., "Photoportals: Shared References in Space and Time", In Proceedings of the 17th ACM Conference on Computer Supported Cooperative Work & Social Computing, Feb. 15, 2014, pp. 1388-1399.

Lifton, et al. "Dual Reality: Merging the Real and Virtual", In Proceedings of International Conference on Facets of Virtual Environments, Jul. 27, 2009, pp. 1-16.

Mathews, et al., "Are You There? Active Attention for Person Tracking in Mixed Reality Environments", In Proceedings of the 10th Annual International Workshop on Presence, Oct. 25, 2007, pp. 321-327.

Neal Meghan, "Here's What Wi-Fi Would Look Like If We Could See It", retrieved on Aug. 3, 2015, available at: <<http://motherboard.vice.com/blog/this-is-what-wi-fi-would-look-like-if-we-could-see-it>>, Jul. 22, 2013, 4 pages.

Pirzadeh, et al., "Designing Multi-Touch Gestures to Support Emotional Expression in IM", In Proceedings of Extended Abstracts on Human Factors in Computing Systems, Apr. 26, 2014, pp. 2515-2520.

Reality Media Lab, "Gr.4 Constructing the Advanced Mixed Reality Space Using Audio-Visual Senses", retrieved on: Jul. 31, 2015, available at: <<http://www.rm.is.ritsumei.ac.jp/english/g4.html>>, 3 pages.

Regenbrecht, et al., "Interaction in a Collaborative Augmented Reality Environment", In Proceedings of Conference on Human Factors in Computing Systems, Apr. 20, 2002, pp. 504-505.

Reilly, et al., "SecSpace: Prototyping Usable Privacy and Security for Mixed Reality Collaborative Environments", In Proceedings of the Symposium on Engineering Interactive Computing Systems, Jun. 17, 2014, pp. 273-282.

Sargaana, et al., "Collaborative billiARds: Towards the Ultimate Gaming Experience", In Proceedings of 4th International Conference on Entertainment Computing, Sep. 19, 2005, pp. 361-371.

Sokol, Zach, "WiFi Visualization Lets Us See the Ghostly Waves that Surround Us", retrieved on Aug. 3, 2015, available at: <<http://iq.intel.com/visualizing-the-ghostly-wifi-waves-that-surround-us/>>, Jun. 26, 2014, 9 pages.

Sotiriou, et al., "Visualizing the Invisible: The Connect Approach for Teaching Science", In Proceedings of Sixth International Conference on Advanced Learning Technologies, Jul. 5, 2006, 3 pages.

Strauss, et al., "Linking between real and virtual spaces", Published on: Jul. 1999 Available at: http://cid.nada.kth.se/pdf/cid_90.pdf, 110 Pages.

Tan, et al., "The Best of Two Worlds: Merging Virtual and Real for Face to Face Collaboration", In Proceedings of the Workshop on Shared Environments to Support Face-to-Face Collaboration, Dec. 2000, 5 pages.

The Blueprint, "An Interview with Helen Papagiannis", retrieved on Aug. 5, 2015, available at <<https://theblueprint.com/stories/helen-papagiannis/>>, Nov. 12, 2014, 21 pages.

Yarosh, et al., "Almost Touching Parent Child Remote Communication Using the ShareTable System", In Proceedings of Conference on Computer Supported Cooperative Work, Feb. 23, 2012, 12 pages.

Zhang, et al., "Capturing Images with Sparse Informational Pixels using Projected 3D Tags", In the Proceedings of the IEEE Conference on Virtual Reality , Mar. 2008, pp. 11-18.

(56) References Cited

OTHER PUBLICATIONS

International Search Report and Written Opinion for PCT/US2016/043221 dated Sep. 28, 2016, 10 pages.
"Second Written Opinion Issued in PCT Application No. PCT/US2016/043221", dated Jun. 29, 2017, 7 Pages.

* cited by examiner

1100 ⟶

```
┌─────────────────────────────────────────────────────────────┐
│ RECEIVE, FROM A FIRST CLIENT DEVICE, A REQUEST TO SHARE A VIRTUAL │
│         CONTENT ITEM WITH ONE OR MORE OTHER DEVICES         │
│                            1102                             │
└─────────────────────────────────────────────────────────────┘
                              ↓
┌─────────────────────────────────────────────────────────────┐
│        SEND COMMAND TO ONE OR MORE OTHER CLIENT DEVICES     │
│                            1104                             │
└─────────────────────────────────────────────────────────────┘
                              ↓
┌─────────────────────────────────────────────────────────────┐
│ CAUSE THE VIRTUAL CONTENT ITEM TO BE PRESENTED VIA THE ONE OR MORE │
│                      OTHER CLIENT DEVICES                   │
│                            1106                             │
└─────────────────────────────────────────────────────────────┘
```

FIG. 11

MIXED REALITY SOCIAL INTERACTION

RELATED APPLICATION

This application claims the benefit of U.S. Provisional Application No. 62/202,614 filed on Aug. 7, 2015, the entire contents of which are incorporated herein by reference.

BACKGROUND

Computing systems can help generate new environments including virtual reality environments and/or mixed reality environments. Virtual reality is an immersive experience, which simulates physical presence in a real or imagined environment. For example, a virtual reality environment can immerse a physical, real-world person with computer-generated graphics in a computer-generated, virtual scene via a virtual reality display device. Mixed reality, which can also be known as augmented reality, is a hybrid reality experience, which merges real worlds and virtual worlds. Mixed reality is a technology that produces mixed reality environments where a physical, real-world person and/or objects in physical, real-world scenes co-exist with virtual, computer-generated people and/or objects in real time. For example, a mixed reality environment can augment a physical, real-world scene and/or a physical, real-world person with computer-generated graphics in the physical, real-world scene viewed via a mixed reality display device.

Virtual reality environments enable multiple users to share computer-generated, virtual scenes. In such examples, the multiple users can interact with computer-generated graphics in a computer-generated, virtual scene via virtual reality display devices associated with each of the users. However, mixed reality environments are typically limited to single-user applications. That is, mixed reality environments are not configured to enable multiple users to interact with one another and/or real objects and/or computer-generated graphics in physical, real-world scenes at the same time.

SUMMARY

Mixed reality social interactions are described. Techniques described herein include determining authentication information associated with a mixed reality display device and determining that a content item is visible in a mixed reality environment associated with the mixed reality display device based at least in part on accessing content data associated with a plurality of content items and determining, based at least in part on the authentication information and the content data, that the content item is owned by the mixed reality display device and/or has been shared with the mixed reality display device. The content data may indicate an identification of a content item of the plurality of content items, an owner of the content item, and permissions associated with the content item. The techniques further describe causing a graphical representation of the content item to be presented via a display on the mixed reality display device.

It should be appreciated that the above-described subject matter can be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of techniques in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The Detailed Description is set forth with reference to the accompanying figures, in which the left-most digit of a reference number identifies the figure in which the reference number first appears. The use of the same reference numbers in the same or different figures indicates similar or identical items or features.

FIG. 11 is a flow diagram that illustrates an example process to cause the visibility of virtual content to be modified in a mixed reality environment.

DETAILED DESCRIPTION

Figure 1:
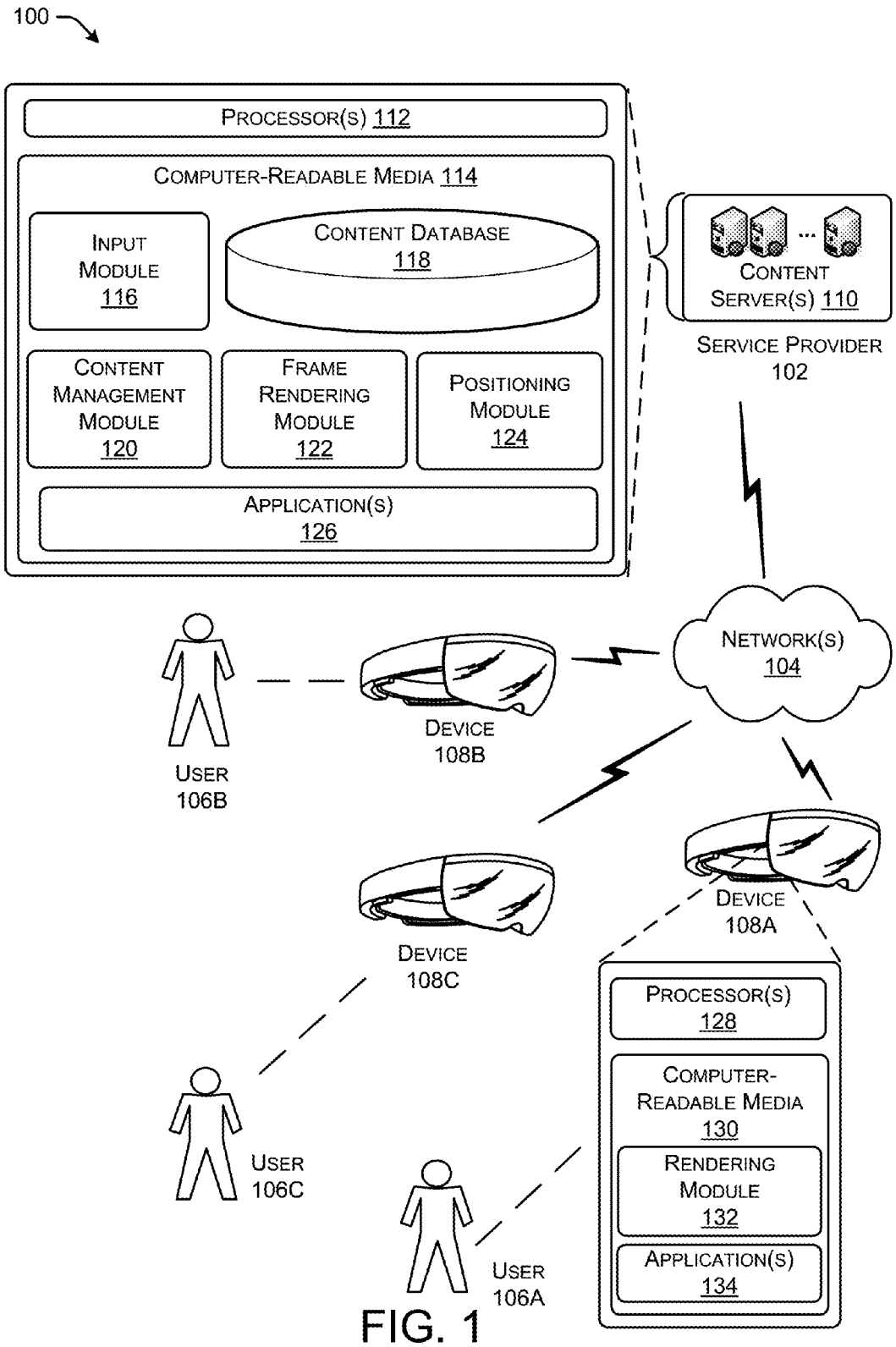
FIG. 1 is a schematic diagram showing an example environment for enabling two or more users in a mixed reality environment to interact with one another and/or with virtual content that is presented in the mixed reality environment.

This disclosure describes techniques for enabling two or more users in a mixed reality environment to interact with one another and/or with virtual content that is presented in the mixed reality environment. The techniques described herein can enhance mixed reality social interactions between users in mixed reality environments. In at least one example, the techniques are directed to mixed reality social interactions between two or more users who are physically located in a same real scene, as described below, and the real scene is unmarked (i.e., lacking predetermined and/or machine vision-specific markings for directing interactions between the two or more users). The techniques described herein can have various applications, including but not limited to, enabling users that are located in a same real scene to share virtual content and/or interact with the virtual content in a mixed reality environment via mixed reality display devices. The techniques described herein enable enhanced user interfaces to be presented on displays of mixed reality devices thereby enhancing mixed reality social interactions between users and the mixed reality experience.

For the purposes of this discussion, physical, real-world objects ("real objects") or physical, real-world people ("real people" and/or "real person") describe objects or people, respectively, that physically exist in a physical, real-world scene ("real scene") associated with a mixed reality display. Real objects and/or real people can move in and out of a field of view based on movement patterns of the real objects and/or movement of a user and/or user device. Virtual, computer-generated content ("virtual content" and/or "content items") can describe content that is generated by one or more computing devices to supplement the real scene in a user's field of view. In at least one example, virtual content can include one or more pixels each having a respective color or brightness that are collectively presented on a display such to represent a person, object, etc. that is not physically present in a real scene. That is, in at least one example, virtual content can include graphics that are representative of objects ("virtual objects"), people ("virtual people" and/or "virtual person"), biometric data, effects, etc. Virtual content can include two dimensional graphics, three dimensional objects, content associated with applications, etc. Virtual content can be rendered into the mixed reality environment via techniques described herein. In additional and/or alternative examples, virtual content can include computer-generated content such as sound, video, global positioning system (GPS), etc.

Mixed reality experiences offer different opportunities to affect self-perception and new ways for communication to occur. The techniques described herein enable users to interact with one another and/or with virtual content in mixed reality environments using mixed reality devices. In at least one example, the techniques described herein can enable conversational partners to share virtual content and/or interact with virtual content in mixed reality environments. While the techniques described herein are directed to mixed reality environments, as described above, mixed reality may also be known as augmented reality. Accordingly, the techniques described herein should not be construed to exclude augmented reality environments.

Illustrative Environments

FIG. 1 is a schematic diagram showing an example environment 100 for enabling two or more users in a mixed reality environment to interact with one another and with virtual content that is presented in the mixed reality environment. More particularly, the example environment 100 can include a service provider 102, one or more networks 104, one or more users 106 (e.g., user 106A, user 106B, user 106C, etc.) and one or more devices 108 (e.g., device 108A, device 108B, device 108C, etc.) associated with the one or more users 106 (e.g., user 106A, user 106B, user 106C, etc.).

The service provider 102 can be any entity, server(s), platform, console, computer, etc., that facilitates two or more users 106 interacting in a mixed reality environment to enable individual users (e.g., user 106A, user 106B, and/or user 106C) of the two or more users 106 to interact with one another and/or with virtual content in the mixed reality environment. The service provider 102 can be implemented in a non-distributed computing environment or can be implemented in a distributed computing environment, possibly by running some modules on devices 108 or other remotely located devices. As shown, the service provider 102 can include one or more server(s) 110, which can include one or more processing unit(s) (e.g., processor(s) 112) and computer-readable media 114, such as memory. In various examples, the service provider 102 can access, receive, and/or determine authentication data from a device (e.g., device 108A), access content data associated with virtual content items, send rendering data associated with individual virtual content items to the device (e.g., device 108A), and cause the individual virtual content items to be presented on a display associated with the device (e.g., device 108A). For the purpose of this discussion, rendering data may include instructions for rendering a graphical representation of a virtual content item via a display of a device (e.g., device 108A). For instance, the rendering data may include instructions describing the geometry, viewpoint, texture, lighting, shading, etc. associated with a virtual content item. In some examples, the service provider 102 may send rendering data to devices 108 and the devices 108 can render the graphical representations via displays associated with the devices. In other examples, as described below, the service provider 102 may render frames and may send the frames to the devices 108 for presentation via the displays.

In some examples, the service provider 102 can receive frame requests from a device (e.g., device 108A) and can send frame messages to the device (e.g., device 108A) to mitigate latency caused by movement that occurs between sending the frame requests to the service provider 102 and receiving frame messages at and/or rendering corresponding frames via the device (e.g., device 108A). In at least one example, the service provider 102 can receive requests from individual devices (e.g., device 108A, device 108B, device 108C, etc.) of the one or more devices 108 associated with sharing virtual content items with other devices 108 (e.g., a request to view and/or access a virtual content items) and/or requests for performing interactions on the virtual content items, and the service provider 102 can synchronize communications and/or content rendering between the devices 108 to ensure that the virtual content items and interactions directed to the virtual content items are presented to corresponding users 106 at a substantially same time so that each of the users 106 has a same experience.

In some examples, the networks 104 can be any type of network known in the art, such as the Internet. Moreover, the devices 108 can communicatively couple to the networks 104 in any manner, such as by a global or local wired or wireless connection (e.g., local area network (LAN), intranet, Bluetooth, etc.). The networks 104 can facilitate communication between the server(s) 110 and the devices 108 associated with the one or more users 106.

Examples support scenarios where device(s) that can be included in the one or more server(s) 110 can include one or more computing devices that operate in a cluster or other clustered configuration to share resources, balance load, increase performance, provide fail-over support or redundancy, or for other purposes. Device(s) included in the one or more server(s) 110 can represent, but are not limited to, desktop computers, server computers, web-server computers, personal computers, mobile computers, laptop computers, tablet computers, wearable computers, implanted computing devices, telecommunication devices, automotive computers, network enabled televisions, thin clients, terminals, game consoles, gaming devices, work stations, media players, digital video recorders (DVRs), set-top boxes, cameras, integrated components for inclusion in a computing device, appliances, or any other sort of computing device.

Device(s) that can be included in the one or more server(s) 110 can include any type of computing device having one or more processing unit(s) (e.g., processor(s) 112) operably connected to computer-readable media 114 such as via a bus, which in some instances can include one or more of a system bus, a data bus, an address bus, a PCI bus, a Mini-PCI bus, and any variety of local, peripheral, and/or independent buses. Executable instructions stored on computer-readable media 114 can include, for example, an input module 116, a content database 118, a content management module 120, a frame rendering module 122, a positioning module 124, and one or more applications 126, and other modules, programs, or applications that are loadable and executable by the processor(s) 112.

Alternatively, or in addition, the functionality described herein can be performed, at least in part, by one or more hardware logic components such as accelerators. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. Device(s) that can be included in the one or more server(s) 110 can further include one or more input/output (I/O) interface(s) coupled to the bus to allow device(s) to communicate with other devices such as input peripheral devices (e.g., a keyboard, a mouse, a pen, a game controller, a voice input device, a touch input device, gestural input device, a tracking device, a mapping device, an image camera, a time-of-flight (TOF) camera, a depth sensor, a physiological sensor, and the like) and/or output peripheral devices (e.g., a display, a printer, audio speakers, a haptic output, and the like). Such network interface(s) can include one or more network interface controllers (NICs) or other types of transceiver devices to send and receive communications over a network. For simplicity, some components are omitted from the illustrated environment.

Processing unit(s) (e.g., processor(s) 112) can represent, for example, a CPU-type processing unit, a GPU-type processing unit, an HPU-type processing unit, a field-programmable gate array (FPGA), another class of digital signal processor (DSP), or other hardware logic components that can, in some instances, be driven by a CPU. For example, and without limitation, illustrative types of hardware logic components that can be used include Application-Specific Integrated Circuits (ASICs), Application-Specific Standard Products (ASSPs), System-on-a-chip systems (SOCs), Complex Programmable Logic Devices (CPLDs), etc. In various examples, the processing unit(s) (e.g., processor(s) 112) can execute one or more modules and/or processes to cause the server(s) 110 to perform a variety of functions, as set forth above and explained in further detail in the following disclosure. Additionally, each of the processing unit(s) (e.g., processor(s) 112) can possess its own local memory, which also can store program modules, program data, and/or one or more operating systems.

In at least one configuration, the computer-readable media 114 of the server(s) 110 can include components that facilitate interaction between the service provider 102 and the one or more devices 108. The components can represent pieces of code executing on a computing device. For example, the computer-readable media 114 can include the input module 116, the content database 118, the content management module 120, the frame rendering module 122, the positioning module 124, and the one or more applications 126, etc. In at least some examples, the modules can be implemented as computer-readable instructions, various data structures, and so forth via at least one processing unit(s) (e.g., processor(s) 112) to enable two or more users 106 in a mixed reality environment to interact with one another and with virtual content that is presented in the mixed reality environment. Functionality to perform these operations can be included in multiple devices or a single device.

Depending on the exact configuration and type of the server(s) 110, the computer-readable media 114 can include computer storage media and/or communication media. Computer storage media can include volatile memory, non-volatile memory, and/or other persistent and/or auxiliary computer storage media, removable and non-removable computer storage media implemented in any method or technology for storage of information such as computer readable instructions, data structures, program modules, or other data. Computer memory is an example of computer storage media. Thus, computer storage media includes tangible and/or physical forms of media included in a device and/or hardware component that is part of a device or external to a device, including but not limited to random-access memory (RAM), static random-access memory (SRAM), dynamic random-access memory (DRAM), phase change memory (PRAM), read-only memory (ROM), erasable programmable read-only memory (EPROM), electrically erasable programmable read-only memory (EEPROM), flash memory, compact disc read-only memory (CD-ROM), digital versatile disks (DVDs), optical cards or other optical storage media, miniature hard drives, memory cards, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast, communication media can embody computer readable instructions, data structures, program modules, or other data in a modulated data signal, such as a carrier wave, or other transmission mechanism. The term "modulated data signal" means a signal that has one or more of its characteristics set or changed in such a manner as to encode information in the signal. Such signals or carrier waves, etc. can be propagated on wired media such as a wired network or direct-wired connection, and/or wireless media such as acoustic, RF, infrared and other wireless media. As defined herein, computer storage media does not include communication media. That is, computer storage media does not include communications media consisting solely of a modulated data signal, a carrier wave, or a propagated signal, per se.

The input module 116 is configured to receive input from one or more devices 108 (e.g., device 108A, device 108B, device 108C, etc.) each corresponding to a user (e.g., user 106A, user 106B, user 106C, etc.). In at least one example, the input module 116 can access, receive, and/or determine authentication data from a device (e.g., device 108A). The authentication data can correspond to a user identification and password associated with a user (e.g., user 106A) associated with the device (e.g., device 108A), biometric identification associated with a user (e.g., user 106A) associated with the device (e.g., device 108A), etc. In at least one example, the authentication data can be leveraged to determine presence of corresponding devices 108 in a mixed reality environment. For the purpose of this discussion, presence may indicate that a device (e.g., device 108A) is located in and/or interacting with other devices (e.g., device 108B, device 108C, etc.) and/or virtual content in a mixed reality environment.

In additional and/or alternative examples, the authentication data can be utilized to determine virtual content items that are available to the user (e.g., user 106A) and the user's (e.g., user 106A) permissions corresponding to viewing and/or interacting with each of the virtual content items. In at least one example, the authentication data can be utilized for causing virtual content items to be presented in a same mixed reality environment where a user (e.g. user 106A) previously left the virtual content item and in a same position where the user (e.g., user 106A) previously left the virtual content item (e.g., if a user (e.g., user 106A) removes his or her head mounted display device (e.g., device 108A), turns off his or her device (e.g., device 108A), etc.).

The content database 118 is configured to store content data associated with virtual content. Content data associated with the individual virtual content items can be stored in the content database 118. Each individual virtual content item can be associated with data indicating an owner identification, a content identification, and permissions (i.e., permissions data). Data associated with an owner of a virtual content item may identify a user (e.g., user 106A, user 106B, user 106C, etc.) that generated and/or has control over the permissions associated with a virtual content item. That is, an owner of a virtual content item can correspond to a user (e.g., user 106A, user 106B, user 106C, etc.) that generated and/or has control over the permissions associated with the virtual content item. Content identification can correspond to data indicating the content associated with the virtual content item. Permissions data can include information indicating which users 106 and/or corresponding devices 108 have permission to view and/or interact with the virtual content in the mixed reality environment (i.e., which users 106 the owner has shared the virtual content with). For instance, the permission data can reflect whether a virtual content item is public, private, visible by some devices (e.g., device 108A, device 108B, and/or device 108C), etc. Additionally and/or alternatively, the permissions data can indicate which interactions particular users 106 can perform and/or which interactions particular users 106 are prohibited from performing In some examples, the permissions data can be based on input from the owner of the corresponding virtual content item, as described below.

In at least one example, the user (e.g., user 106A) associated with a device (e.g., device 108A) that initially requests the virtual content item can be the owner of the virtual content item such that he or she can modify the permissions associated with the virtual content item. In at least one example, the owner of the virtual content item can determine which other users (e.g., user 106B and/or user 106C) can view the virtual content item (i.e., whether the virtual content item is visible to the other users 106). For instance, in an example, an owner of a virtual content item can utilize a menu (e.g., a dropdown menu, a radial menu, etc.) or other mechanisms to share the virtual content item with all users 106 in a same mixed reality environment (i.e., make the virtual content item public), share the virtual content item with some users (e.g., user 106A, user 106B, and/or user 106C) in the same mixed reality environment, or not share the virtual content item with any other users 106 (i.e., make the virtual content item private). That is, in some examples, the owner of the virtual content item can determine whether a virtual content item is visible or not visible via other devices 108. In other examples, the owner of the virtual content item can determine which other users (e.g., user 106B and/or user 106C) can interact with the virtual content item via corresponding devices (e.g., device 108B and/or device 108C) and/or which interactions are permitted.

The content management module 120 manages the ownership of virtual content items and can leverage the permissions data to determine which of the other users (e.g., user 106B and/or user 106C) and/or corresponding devices (e.g., device 106B and/or user 106C) have permission to view individual virtual content items and/or interact with individual virtual content items. That is, the content management module 120 may access the content data to determine devices 108 with which a content item has been shared and/or interactions available for each of the devices 108. As described above, the content data may include permissions data which indicates whether a content item is public, private, or has been shared with one or more devices (e.g., device 108B, device 108C, etc.) and/or interactions available for each of the devices 108.

In various examples, the frame rendering module 122 can receive frame request messages from a requesting device (e.g., device 108A) of the one or more devices 108. Frame request messages can include, but are not limited to, pose information associated with each eye of a user (e.g., user 106A), a timestamp, a desired resolution, and a desired field of view. Pose information can include a position and a rotation relative to a common coordinate system (i.e., a coordinate system that is consistently defined for both the device (e.g., device 108A) and the service provider 102), which for the purpose of this discussion, may be referred to as the worldspace coordinate system. A time stamp may represent a time in which the frame request message was generated and/or sent. A desired resolution may be a desired level of detail associated with rendered virtual content (i.e., a higher resolution amounts to more detail in the virtual content). In some examples, resolution can describe a pixel count in a digital image. A desired field of view may describe an extent to which the observable world is desired to be seen at any given time through a display of a mixed reality display device (e.g., device 108A, device 108B, device 108C, etc.). In some examples, field of view may describe an angle of view.

The frame request message can be processed by the frame rendering module 122 to enable virtual content to be rendered from a particular user's point of view (e.g., user 106A). The frame rendering module 122 may generate a frame message responsive to a frame request message. The resulting frame message can include a same timestamp which was sent in the associated frame request message, the determined resolution, the determined field of view, the pose of each eye as sent in the associated frame request message, and the render distance. In some examples, the frame rendering module 122 can be configured to render stereo images (one image per eye of a user (e.g., user 106A)) for each frame request message. The stereo images may represent frames. A first image of the stereo images can correspond to the left eye of a user (e.g., user 106A) and a second image of the stereo images can correspond to a right eye of a user (e.g., user 106A). In at least one example, a frame message may include rendered stereo images. In some examples, the frame rendering module 122 can render a mixed reality scene at a different resolution or field of view than the requested desired values. The resulting resolution and/or field of view may be associated with the frame message, described above. The frame rendering module 122 can send the frame message to the requesting device (e.g., device 108A).

The requesting device (e.g., device 108A) can receive the frame message, process the received frame message, and render the stereo images as two quads, or other virtual surfaces, positioned in worldspace in front of a virtual stereo camera associated with the requesting device (e.g., device 108A). In an example, the left stereo image can be textured onto the left quad and the right stereo image can be textured onto the right quad. In such an example, the left quad may be rendered by a left camera associated with a device (e.g., device 108A) and the right quad may be rendered by a right camera associated with a device (e.g., device 108A). Each quad can be positioned in worldspace in front of each eye as specified in the frame message, such that each quad's normal vector is aligned with the eye direction vector. Each quad can be sized such that it can fill the frustum defined by each eye in the received frame message, which can be defined by the combination of the determined field of view and the eye pose information in the frame message. The requesting device (e.g., device 108A), can continue to render both the left and right quads as the user (e.g., user 106A) moves about in worldspace (with the quads fixed in worldspace), until the next frame request message is sent to the frame rendering module 122 and the responsive frame message is received by the requesting device (e.g., device 108A). Based at least in part on receiving the next frame message, the left and right quads can be repositioned and retextured as described according to the data in the frame message (e.g., a same timestamp which was sent in the associated frame request message, the determined resolution, the determined field of view, the pose of each eye as sent in the associated frame request message, and the render distance).

Before the next frame message is received by the requesting device (e.g., 108A), any movement of the user (e.g., user 106A), and corresponding device (e.g., device 108A), relative to the left and right quads (which are fixed in worldspace) can appear as a corresponding and opposite movement of the left and right quads in screenspace (e.g., relative to the screen). For the purpose of this discussion, screenspace can represent the space defined by the display 204 associated with a device (e.g., device 108A). For each frame message, there can be an infinite number of possible valid positions and sizes for the left and right quads defined by a proportional relationship between the worldspace distance from each quad to each eye and the worldspace size of each quad (i.e., the further away these quads are, the larger they may be in order to fill each eye frustum appropriately). The amount of movement in screenspace can be proportionately affected by the distance at which these quads are positioned relative to the user (e.g., user 106A) (i.e., the parallax effect).

To create more natural movement of these quads in screenspace (between frame messages) the distance of these quads (from their associated eye positions) can be determined by using a heuristic to approximate an appropriate distance of the quads. An example of a heuristic can be to calculate the average distance of each virtual object which is visible in the rendered frame. Another example can be to calculate the average distance of each pixel that is visible in the frame rendering module 122. An additional and/or alternative example can be to calculate the distance of the most salient object (or the most salient pixels) in the scene (as determined by any number of factors, including gaze tracking). The frame rendering module 122 can use any of these (or any other) heuristics to calculate a render distance for each frame, which can also be sent in each frame message. This render distance can then be used to define a specific position and size at which the requesting device (e.g., device 108A) can position the left and right quads.

In at least one example, to calculate an average pixel distance, the frame rendering module 122 can render a depth buffer for each frame from a center eye anchor (i.e., the center between both eyes of a user (e.g., user 106A)). In the at least one example, the depth buffer can be rendered using a shader that outputs the pixel depth mapped to a value between 0 and 1 (linearly or otherwise), with 0 being the camera's near plane, and 1 being the camera's far plane. As a non-limiting example, a depth value can be encoded either into one (8-bit) channel of the output buffer, such that the depth value is encoded with a resolution of 255 values (1 byte), or alternatively all four channels in a 32-bit buffer can be leveraged to encode a 32-bit floating point value representing the same depth value (between 0 and 1) at 32-bit precision for each pixel. In the non-limiting example, the resulting depth buffer values (once decoded into a standard 32-bit floating point representation) can be used to determine the worldspace distance between each pixel and the camera which was used to render the depth buffer. In the non-limiting example, the worldspace distance for each pixel is determined by subtracting the near plane distance from the far plane distance, multiplying that difference by the pixel's depth value, and then adding the near plane distance to the result. The frame rendering module 122 can then calculate an average pixel distance by averaging the worldspace distance of each pixel. This average pixel distance can be included in the frame message as the render distance.

In some examples, the frame rendering module 122 may send the depth buffer data in the frame message to the requesting device (e.g., device 108A) and a parallax shader can be used by the requesting device (e.g., device 108A) to approximate movement of the user (e.g., user 106A). In such examples, the frame message may include additional and/or alternative data (e.g., the depth buffer, either for each eye, or for the center eye anchor), and the rendering module 132 may render the virtual content items in the mixed reality environment. In such examples, the frame rendering module 122 may not calculate the average pixel distance and/or a saliency map, as described above.

In at least some examples, the frame rendering module 122 may access the content data to determine which virtual content items a user (e.g., user 106A) has open and/or which virtual content items the user (e.g., user 106A) has shared with other users (e.g., user 106B and/or user 106C).

The positioning module 124 can send instructions associated with rendering virtual content on a display of a device (e.g., device 108A) to the device (e.g., device 108A). That is, the positioning module 124 can send instructions associated with a position and/or placement of virtual content in a mixed reality environment. The instructions can be determined by the content data, and in some examples, may be associated with the rendering data, described below.

Applications (e.g., application(s) 126) are created by programmers to fulfill specific tasks. For example, applications (e.g., application(s) 126) can provide utility, entertainment, educational, and/or productivity functionalities to users 106 of devices 108. Applications (e.g., application(s) 126) can be built into a device (e.g., telecommunication, text message, clock, camera, etc.) or can be customized (e.g., games, news, transportation schedules, online shopping, etc.). Application(s) 126 can provide conversational partners (e.g., two or more users 106) various functionalities, including but not limited to, sharing and/or interacting with virtual content items in a mixed reality environment. In at least some examples, the virtual content items can be applications and/or can be associated with the applications.

In some examples, the one or more users 106 can operate corresponding devices 108 (e.g., user devices) to perform various functions associated with the devices 108. Device(s) 108 can represent a diverse variety of device types and are not limited to any particular type of device. Examples of device(s) 108 can include but are not limited to mobile computers, embedded computers, or combinations thereof. Example mobile computers can include laptop computers, tablet computers, wearable computers, implanted computing devices, telecommunication devices, automotive computers, portable gaming devices, media players, cameras, or the like. Example embedded computers can include network enabled televisions, integrated components for inclusion in a computing device, appliances, microcontrollers, digital signal processors, or any other sort of processing device, or the like. In at least one example, the devices 108 can include mixed reality devices (e.g., CANON® MREAL® System, MICROSOFT® HOLOLENS®, etc.). Mixed reality devices can include one or more sensors and a mixed reality display, as described below in the context of FIG. 2. In FIG. 1, device 108A, device 108B, and device 108C are wearable computers (e.g., head mount devices); however, the devices 108 can be any other device as described above. In at least one example, the devices 108 can be untethered such that they are not physically connected to external devices. However, the devices 108 can be communicatively coupled to external devices, as described herein.

Device(s) 108 can include one or more input/output (I/O) interface(s) coupled to the bus to allow device(s) to communicate with other devices such as input peripheral devices (e.g., a keyboard, a mouse, a pen, a game controller, a voice input device, a touch input device, gestural input device, a tracking device, a mapping device, an image camera, a depth sensor, a physiological sensor, and the like) and/or output peripheral devices (e.g., a display, a printer, audio speakers, a haptic output, and the like). As described above, in some examples, the I/O devices can be integrated into the one or more server(s) 110 and/or other machines and/or devices 108. In other examples, the one or more input peripheral devices can be communicatively coupled to the one or more server(s) 110 and/or other machines and/or devices 108. The one or more input peripheral devices can be associated with a single device (e.g., MICROSOFT® KINECT®, INTEL® Perceptual Computing SDK 2013, LEAP MOTION®, etc.) or separate devices.

Figure 2:
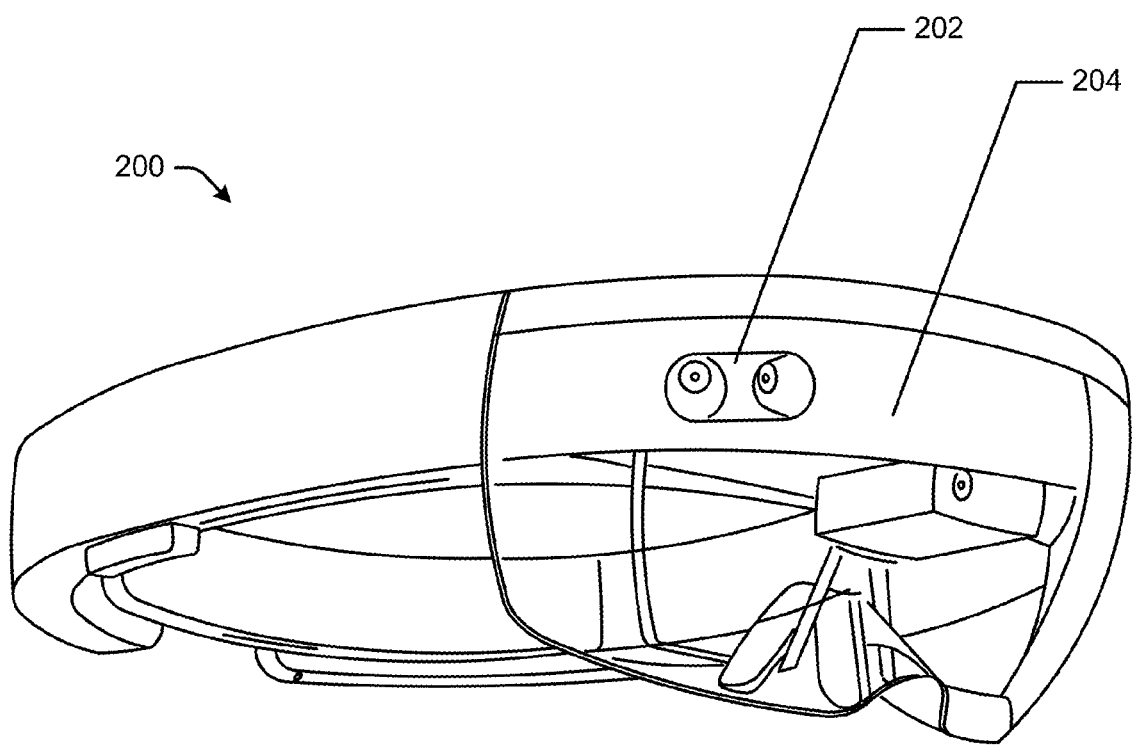
FIG. 2 is a schematic diagram showing an example of a head mounted mixed reality display device.

FIG. 2 is a schematic diagram showing an example of a head mounted mixed reality display device 200. As illustrated in FIG. 2, the head mounted mixed reality display device 200 can include one or more sensors 202 and a display 204. The one or more sensors 202 can reconstruct the real scene in which the one or more users 106 are physically located and track real people and/or objects within the real scene. The one or more sensors 202 can include cameras and/or sensors. The cameras can include image cameras, stereoscopic cameras, trulight cameras, etc. The sensors can include depth sensors, color sensors, acoustic sensors, optical sensors, pattern sensors, gravity sensors, etc. The cameras and/or sensors can output streams of data in substantially real time. The data can include moving image data and/or still image data (e.g., tracking data) representative of movement of real people and/or real objects in a real scene that is observable by the cameras and/or sensors. Additionally, the data can include depth data.

Tracking devices can output the moving image data and/or still image data (e.g., tracking data) representative of movement of real people and/or real objects in a real scene. Tracking devices can include optical tracking devices (e.g., VICON®, OPTITRACK®), magnetic tracking devices, acoustic tracking devices, gyroscopic tracking devices, mechanical tracking systems, depth cameras (e.g., KINECT®, INTEL® RealSense, etc.), inertial sensors (e.g., INTERSENSE®, XSENS, etc.), combinations of the foregoing, etc. The tracking devices can output streams of volumetric data, skeletal data, perspective data, etc. in substantially real time. The streams of volumetric data, skeletal data, perspective data, etc. can be received by the input module 116 in substantially real time. Volumetric data can correspond to a volume of space occupied by a body of a user (e.g., user 106A, user 106B, or user 106C). Skeletal data can correspond to data used to approximate a skeleton, in some examples, corresponding to a body of a user (e.g., user 106A, user 106B, or user 106C), and track the movement of the skeleton over time. The skeleton corresponding to the body of the user (e.g., user 106A, user 106B, or user 106C) can include an array of nodes that correspond to a plurality of human joints (e.g., elbow, knee, hip, etc.) that are connected to represent a human body. Perspective data can correspond to data collected from two or more perspectives that can be used to determine an outline of a body of a user (e.g., user 106A, user 106B, or user 106C) from a particular perspective.

Combinations of the volumetric data, the skeletal data, and the perspective data can be used to determine body representations corresponding to users 106. The body representations can approximate a body shape of a user (e.g., user 106A, user 106B, or user 106C). That is, volumetric data associated with a particular user (e.g., user 106A), skeletal data associated with a particular user (e.g., user 106A), and perspective data associated with a particular user (e.g., user 106A) can be used to determine a body representation that represents the particular user (e.g., user 106A). The body representations can be used by the rendering module 132 to determine where to render virtual content in the three dimensional coordinate system (e.g. worldspace) corresponding to the real space where the particular user (e.g., user 106A) is physically located.

The depth data can represent distances between real objects in a real scene observable by sensors and/or cameras and the sensors and/or cameras. The depth data can be based at least in part on infrared (IR) data, trulight data, stereoscopic data, light and/or pattern projection data, gravity data, acoustic data, etc. In at least one example, the stream of depth data can be derived from IR sensors (e.g., time of flight, etc.) and can be represented as a point cloud reflective of the real scene. The point cloud can represent a set of data points or depth pixels associated with surfaces of real objects and/or the real scene configured in a three dimensional coordinate system (e.g., worldspace). The depth pixels can be mapped into a grid. The grid of depth pixels can indicate a distance between real objects in the real scene and the cameras and/or sensors. The grid of depth pixels that correspond to the volume of space that is observable from the cameras and/or sensors can be called a depth space. The depth space can be utilized by the rendering module 132 (in the devices 108) for determining how to render virtual content in the mixed reality display.

In some examples, the one or more sensors 202 can be integrated into the head mounted mixed reality display device 200 and/or devices 108. In such examples, the one or more sensors 202 correspond to inside-out sensing sensors; that is, sensors that capture information from a first person perspective. In additional or alternative examples, the one or more sensors can be external to the head mounted mixed reality display device 200 and/or devices 108. In such examples, the one or more sensors 202 can be arranged in a room (e.g., placed in various positions throughout the room), associated with a device, etc. Such sensors can correspond to outside-in sensing sensors; that is, sensors that capture information from a third person perspective. In yet another example, the sensors can be external to the head mounted mixed reality display device 200 but can be associated with one or more wearable devices configured to collect data associated with the user (e.g., user 106A, user 106B, or user 106C).

The display 204 can present visual content to the one or more users 106 in a mixed reality environment. In some examples, the display 204 can present the mixed reality environment to a user (e.g., user 106A) in a spatial region that occupies an area that is substantially coextensive with the user's (e.g., user 106A) actual field of vision. In other examples, the display 204 can present the mixed reality environment to the user (e.g., user 106A) in a spatial region that occupies a lesser portion of a user's (e.g., user 106A) actual field of vision. The display 204 can include a transparent display that enables a user (e.g., user 106A) to view the real scene where he or she is physically located. Transparent displays can include optical see-through displays where the user (e.g., user 106A) sees the real scene he or she is physically present in directly, video see-through displays where the user (e.g., user 106A) observes the real scene in a video image acquired from a mounted camera, etc. The display 204 can present the virtual content to the user (e.g., user 106A) such that the virtual content augments the real scene where the user (e.g., user 106A) is physically located within the spatial region.

The virtual content can appear differently to different users (e.g., user 106A, user 106B, and/or user 106C) based on the users' perspectives and/or the location of the corresponding devices (e.g., device 108A, device 108B, and/or device 108C). For instance, the size of a virtual content item can be different based on a proximity of a user (e.g., user 106A, user 106B, and/or user 106C) and/or device (e.g., device 108A, device 108B, and/or device 108C) to the virtual content item. Additionally or alternatively, the shape of the virtual content item can be different based on the vantage point of a user (e.g., user 106A, user 106B, and/or user 106C) and/or device (e.g., device 108A, device 108B, and/or device 108C). For instance, a virtual content item can have a first shape when a user (e.g., user 106A, user 106B, and/or user 106C) and/or device (e.g., device 108A, device 108B, and/or device 108C) is looking at the virtual content item straight on and can have a second shape when a user (e.g., user 106A, user 106B, and/or user 106C) and/or device (e.g., device 108A, device 108B, and/or device 108C) is looking at the virtual item from the side.

The devices 108 can include one or more processing unit(s) (e.g., processor(s) 128), computer-readable media 130, at least including a rendering module 132 and one or more applications 134. The one or more processing unit(s) (e.g., processor(s) 128) can represent same units and/or perform same functions as processor(s) 112, described above. Computer-readable media 130 can represent computer-readable media 114 as described above. Computer-readable media 130 can include components that facilitate interaction between the service provider 102 and the one or more devices 108. The components can represent pieces of code executing on a computing device, as described above. Computer-readable media 128 can include at least a rendering module 132. The rendering module 132 can receive content data from the service provider 102 and can render virtual content items on the display 204 of the device (e.g., device 108A, device 108B, or device 108C). In at least one example, the rendering module 132 can leverage a standard graphics rendering pipeline for rendering virtual content on the display 204. In some examples, the rendering module 132 can receive previously rendered frames (e.g., associated with frame messages) from the service provider 102 to correct for potential latency and/or render correct perspectives based on the position of the user (e.g., user 106A) in worldspace. In other examples, the rendering module 132 may receive rendering data for rendering the virtual content items locally. Application(s) 134 can correspond to same applications as application(s) 128 or different applications.

Example Mixed Reality User Interfaces

Figure 3:
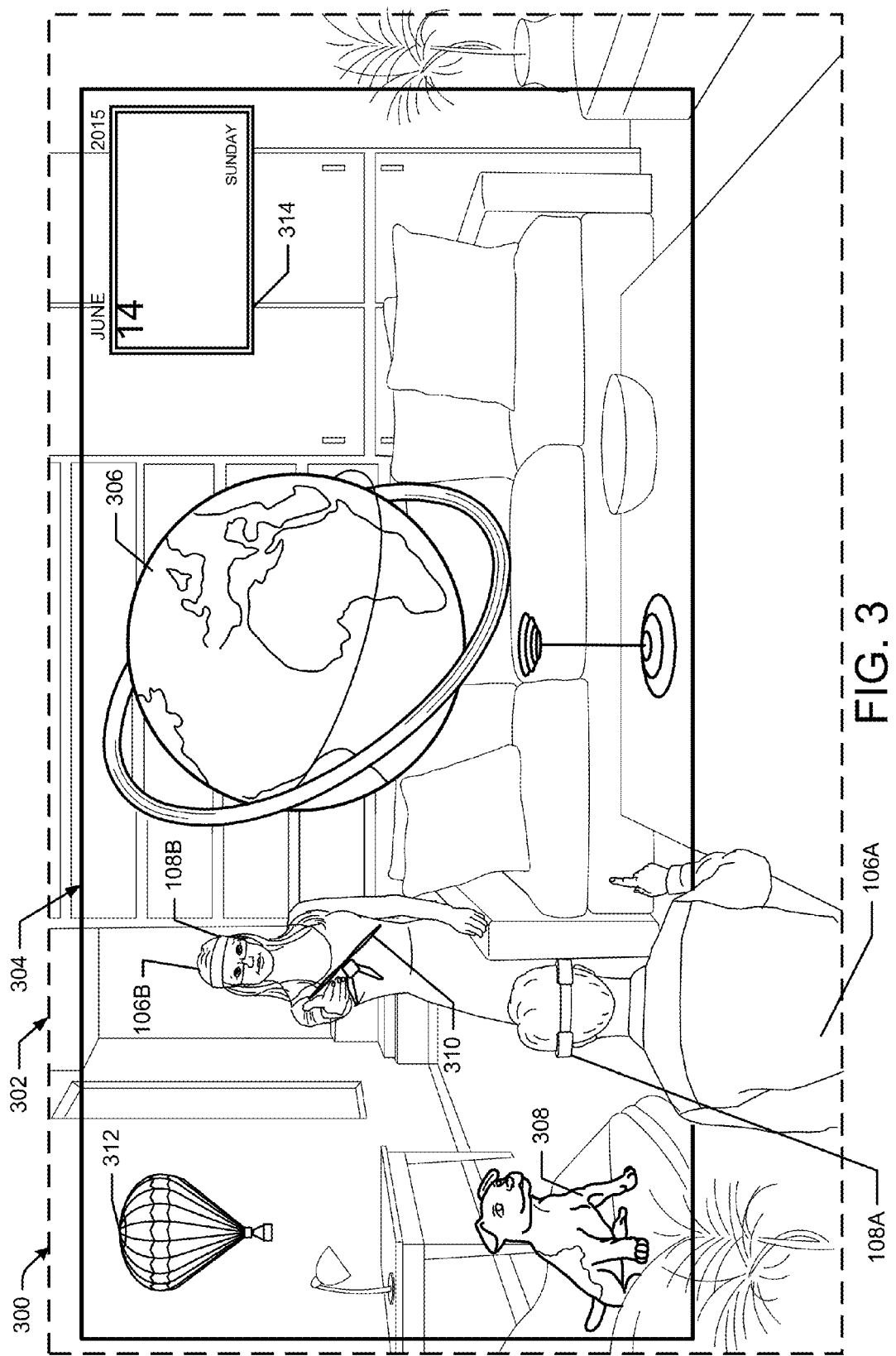
FIG. 3 is a schematic diagram showing an example of a first view of a mixed reality environment wherein two or more users can interact with one another and/or with virtual content that is presented in the mixed reality environment.

FIG. 3 is a schematic diagram showing an example of a first view 300 (e.g., a front view) of a mixed reality environment wherein two or more users (e.g., user 106A and user 106B) can interact with one another and/or with virtual content that is presented in the mixed reality environment. The area depicted in the dashed lines corresponds to a real scene 302 in which the first user (e.g., user 106A) and a second user (e.g., user 106B) are physically present. In some examples, the first user (e.g., user 106A) or the second user (e.g., user 106B) may be remotely located and can be virtually present in the mixed reality environment (e.g., as an avatar, a reconstructed three dimensional model that has been captured using various sensors and/or cameras (e.g., KINECT® or TOF camera)). That is, the device (e.g., device 108A) corresponding to one of the users (e.g., user 106A) may receive streaming data to render the remotely located user (e.g., user 106B) in the mixed reality environment presented by the device (e.g., device 108A). The area depicted in the solid black line corresponds to the spatial region 304 in which the mixed reality environment is visible to the first user (e.g., user 106A) via a display 204 of a corresponding device (e.g., device 108A). As described above, in some examples, the spatial region can occupy an area that is substantially coextensive with a user's (e.g., user 106A) actual field of vision and in other examples, the spatial region can occupy a lesser portion of a user's (e.g., user 106A) actual field of vision. Additional users (e.g., user 106C, etc.) can be present but not visible in the spatial region 304.

In the example of FIG. 3, the first user (e.g., user 106A) can be viewing various virtual content items in his mixed reality environment via a display 204 of his device (e.g., device 108A). As described below, the first user (e.g., user 106A) can have authenticated his device (e.g., device 108A). Based at least in part on authenticating his device (e.g., device 108A), the rendering module 132 associated with his device (e.g., device 108A) can render the various virtual content items on the display 204 corresponding to his device (e.g., device 108A). As a non-limiting example, the first user (e.g., user 106A) can view a graphical representation of a globe 306, a dog 308, a drone 310, a hot air balloon 312, and a calendar 314. The graphical representations are shown in thick black lines to show that they represent virtual content.

In some examples, the first user (e.g., user 106A) can be the owner of each virtual content item. That is, the first user (e.g., user 106A) can determine whether to share individual virtual content items with other users (e.g., user 106B and/or user 106C) in the mixed reality environment, which of the other users (e.g., user 106B and/or user 106C) he wants to share individual virtual content items with, or whether to keep individual virtual content items private (i.e., not share with other users). In the example in FIG. 3, the first user (e.g., user 106A) shared the drone 310 with the second user (e.g., user 106B). The second user (e.g., user 106B) can view the drone 310 and can interact with the drone 310 until the first user (e.g., user 106A) decides to make the drone 310 private. Based at least in part on the first user (e.g., user 106A) making the drone 310 private, the second user (e.g., user 106B) cannot view the drone 310 in the mixed reality environment.

In other examples, one of the other users (e.g., user 106B and/or user 106C) can be the owner of the virtual content item. Accordingly, some of the virtual content items can be visible to the first user (e.g., user 106A) based at least in part on the owner of the virtual content items continuing to share the virtual content items with the first user (e.g., user 106A). However, once the owner makes the virtual content item private and/or no longer shares the virtual content item with the first user (e.g., user 106A), the virtual content item may no longer be visible to the first user (e.g., user 106A).

Figure 4:
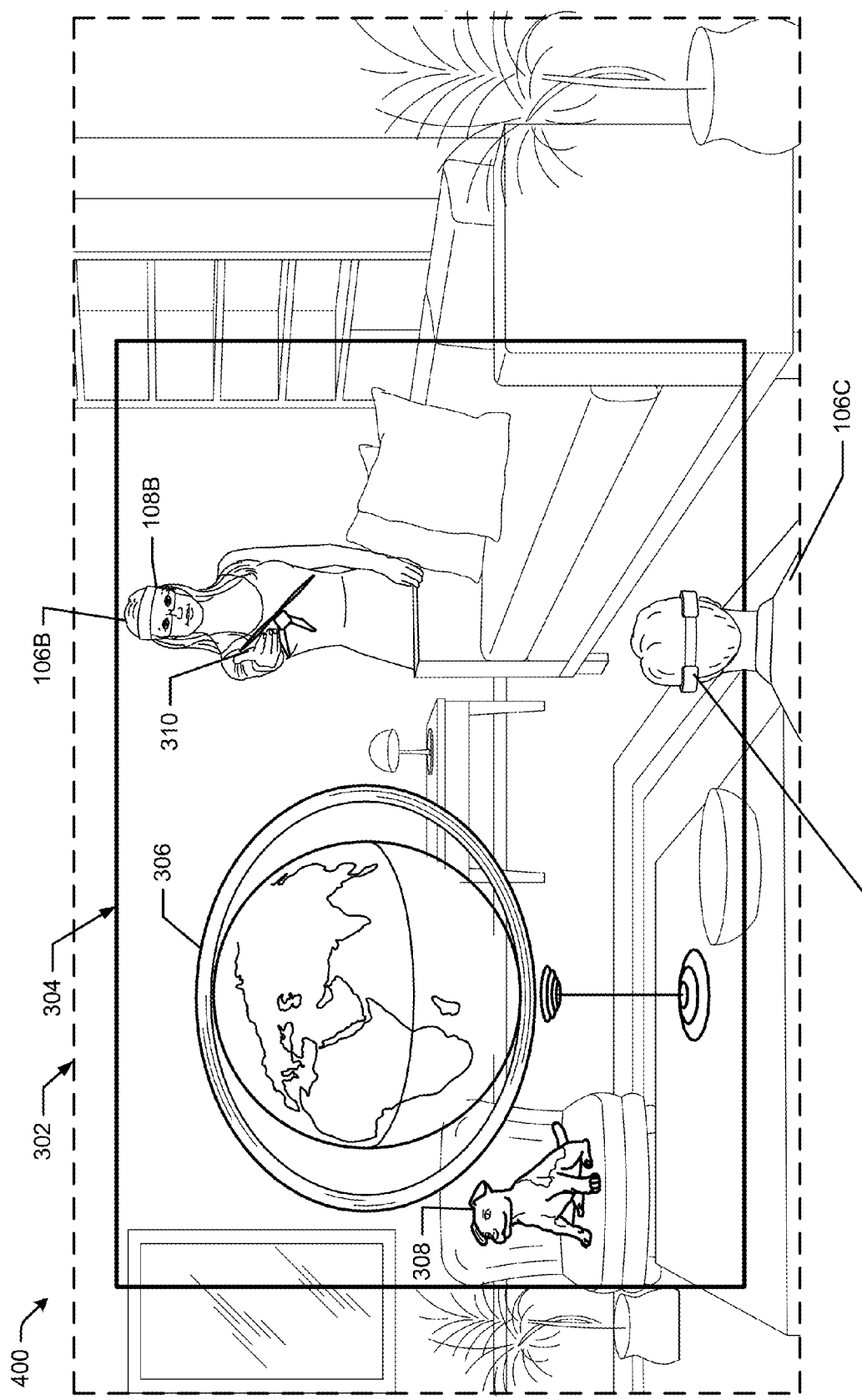
FIG. 4 is a schematic diagram showing an example of a second view of a mixed reality environment wherein two or more users can interact with one another and/or with virtual content that is presented in the mixed reality environment.

FIG. 4 is a schematic diagram showing an example of a second view 400 (e.g., a right side view) of a mixed reality environment wherein two or more users (e.g., user 106A, user 106B, and/or user 106C) can interact with one another and/or with virtual content that is presented in the mixed reality environment. The area depicted in the dashed lines corresponds to the real scene 302 in which the first user (e.g., user 106A), the second user (e.g., user 106B), and a third user (e.g., user 106C) are physically present. The area depicted in the solid black line corresponds to the spatial region 304 in which the mixed reality environment is visible to a third user (e.g., user 106C) via a display 204 of a corresponding device (e.g., device 108C). As described above, in some examples, the spatial region can occupy an area that is substantially coextensive with a user's (e.g., user 106C) actual field of vision and in other examples, the spatial region can occupy a lesser portion of a user's (e.g., user 106C) actual field of vision. As described above, FIG. 4 depicts a different view of the real scene 302 in FIG. 3. FIG. 4 depicts a right side view. That is, the third user (e.g., user 106C) is located on the right side of the room from the first user's (e.g., user 106A) perspective in FIG. 3. The first user (e.g., user 106A) is not in view of the spatial region 304, but is still present in the mixed reality environment (e.g., the first user (e.g., user 106A) would be to the left of the dog 308 if pictured).

In the example illustrated in FIG. 4, the third user (e.g., user 106C) can view various virtual content items in his mixed reality environment via a display 204 of his device (e.g., device 108C). As described below, the third user (e.g., user 106C) can have authenticated his device (e.g., device 108C). Based at least in part on authenticating his device (e.g., device 108C), the rendering module 132 associated with his device (e.g., device 108C) can render the various virtual content items on the display 204 corresponding to his device (e.g., device 108C), as shown in FIG. 4. As a non-limiting example, the third user (e.g., user 106C) can view a graphical representation of a globe 306, a dog 308, and a drone 310. The graphical representations are shown in thick black lines to show that they represent virtual content.

Unlike the first user (e.g., user 106A) in the example in FIG. 3, the third user (e.g., user 106C) cannot see the hot air balloon 312 or the calendar 314. In some examples, the third user (e.g., user 106C) may not see the hot air balloon 312 or the calendar 314 because the third user (e.g., user 106C) does not have permission to view the hot air balloon 312 or the calendar 314 (i.e., the owner of the virtual content item has not shared the hot air balloon 312 or the calendar 314 with the third user (e.g., user 106C)). Accordingly, the hot air balloon 312 and the calendar 314 are not visible to the third user (e.g., user 106C). In other examples, the third user (e.g., user 106C) may not be able to see the hot air balloon 312 or the calendar 314 because the virtual content items are outside of the spatial region 304 within which the third user (e.g., user 106C) can view the mixed reality environment. The third user (e.g., user 106C) can view the globe 306, dog 308, and/or drone 310 and/or can interact with the globe 306, dog 308, and/or drone 310 until the owner of the virtual content items decides to make the globe 306, dog 308, and/or drone 310 private.

Device/Server: Example Architecture and Processes

Figure 5:
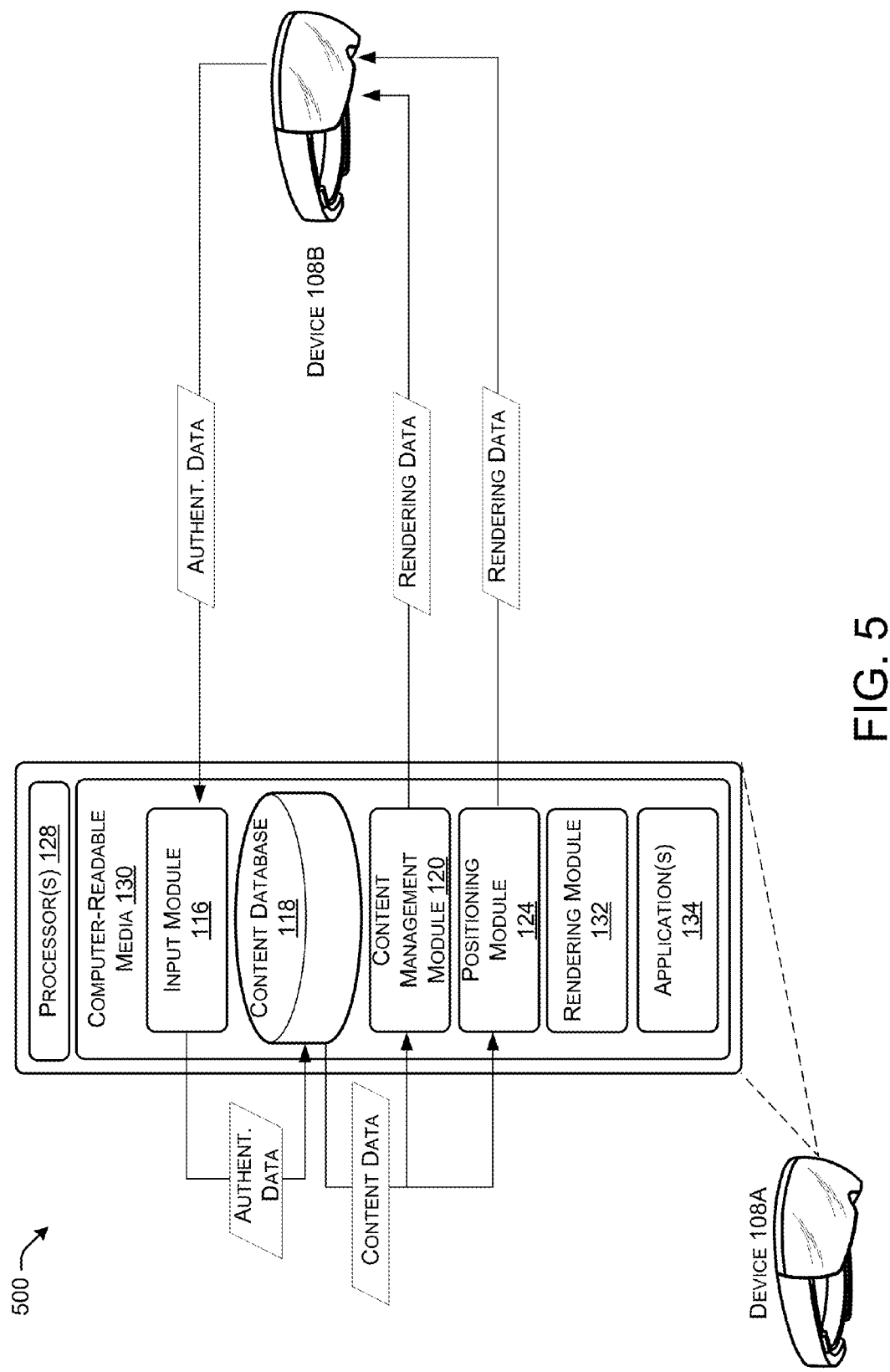
FIG. 5 is a schematic diagram showing an example environment for enabling two or more users in a mixed reality environment to interact with one another and/or with virtual content that is presented in the mixed reality environment.

FIG. 5 is a schematic diagram showing an example environment 500 for enabling two or more users (e.g., user 106A, user 106B, and/or user 106C) in a mixed reality environment to interact with one another and/or with virtual content that is presented in the mixed reality environment. In the example illustrated in FIG. 5, a first device (e.g., device 108A) is assigned a server role and is responsible for synchronizing communications and/or virtual content rendering among all of the devices (e.g., device 108A, device 108B, and/or device 108C). In at least one example, devices (e.g., device 108B and/or device 108C) can run an application 134 locally and connect to the serving device (e.g., device 108A). In FIG. 5, the input module 116, content database 118, content management module 120, and positioning module 124 can be associated with computer-readable media 130 instead of, or in addition to, computer-readable media 114 associated with the service provider 102.

FIG. 5 illustrates a second device (e.g., device 108B) sending authentication data to the first device (e.g., device 108A). The authentication data can correspond to a user identification and password associated with the second user (e.g., user 106B), biometric identification associated with the second user (e.g., user 106B), etc. The authentication data can be utilized to determine a presence of the second device (e.g., device 108B), visual content items that are available to the second user (e.g., user 106B), and the second user's (e.g., user 106B) permissions corresponding to whether the second user (e.g., user 106B) can view and/or interact with individual ones of the virtual content items, as described above.

Based at least in part on receiving the authentication data, the content management module 120 and/or the frame rendering module 122 can access content data from the content database 118. As described above, data associated with the individual virtual content items can be stored in the content database 118. The content data may identify an owner of a virtual content item, an identification of the virtual content item, and permissions associated with the virtual content item. The content data can identify virtual content items that are owned by a profile corresponding to the second user (e.g., user 106B), virtual content items that the second user (e.g., user 106B) has open, and/or content that other users (e.g., user 106A and/or user 106C) have shared with the second user (e.g., user 106B). The content management module 120 and/or the positioning module 124 can utilize the content data to determine whether individual virtual content items can be rendered on various devices (e.g., device 108A and/or device 108C) and/or the permissions associated with each of the individual virtual content items. The content management module 120 and/or the positioning module 124 can send rendering data to the second device (e.g., device 108B) and the second device (e.g., device 108B) can render the corresponding virtual content items in the mixed reality environment associated with the second user (e.g., user 106B). As described above, the second user (e.g., user 106B) can modify the permissions (e.g., visibility, interactivity, etc.) of any of the virtual content items that he or she owns. That is, the second user (e.g., user 106B) can share the virtual content items with other users (e.g., user 106A and/or user 106C). However, the second user (e.g., user 106B) cannot modify the permissions of any of the virtual content items that he or she does not own. The second user (e.g., user 106B) can interact with individual virtual content items until the owner of each of the virtual content items makes a virtual content item private such that the second user (e.g., user 106B) cannot view the virtual content item.

The processes described in FIGS. 6 and 7 below are illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. The example processes are described in the context of the environment 500 of FIG. 5 but are not limited to that environment.

Figure 6:
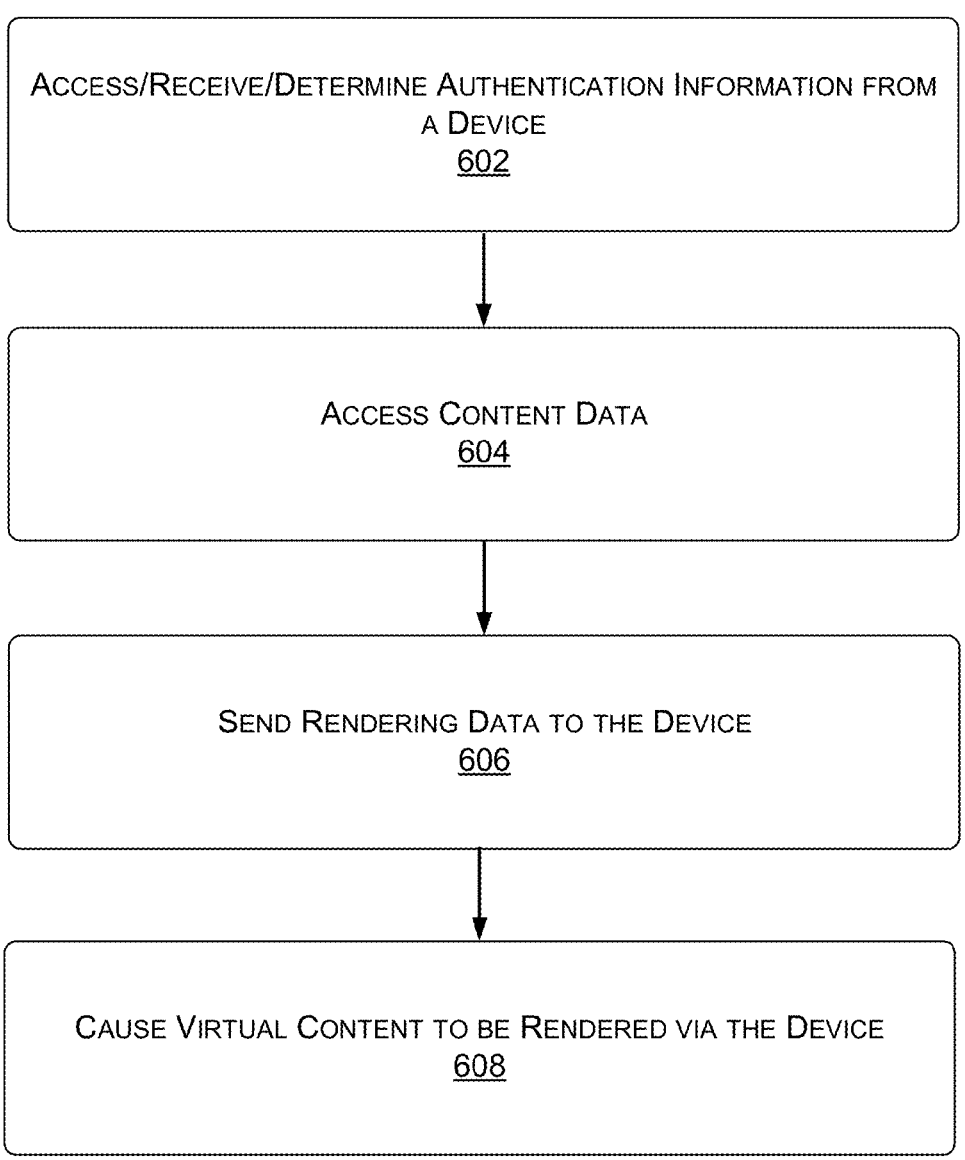
FIG. 6 is a flow diagram that illustrates an example process to cause virtual content to be presented in the mixed reality environment.

FIG. 6 is a flow diagram that illustrates an example process 600 to cause virtual content to be presented in the mixed reality environment.

Block 602 illustrates accessing, receiving, and/or determining authentication information from a device (e.g., device 108B). As illustrated in FIG. 5, a second device (e.g., device 108B) can send authentication data to a first device (e.g., device 108A) that can be designated as a server. The authentication data can correspond to a user identification and password associated with the second user (e.g., user 106B), biometric identification associated with the second user (e.g., user 106B), etc. The authentication data can be utilized to determine a presence of the second device (e.g., device 108B), visual content items that are available to the second user (e.g., user 106B), and the second user's (e.g., user 106B) permissions corresponding to whether the second user (e.g., user 106B) can view and/or interact with the virtual content items, as described above.

Block 604 illustrates accessing content data. Based at least in part on receiving the authentication data, content management module 120 and/or positioning module 124 can access content data from the content database 118. As described above, the content database 118 can include content data indicating an owner identification, a content identification, and permissions associated with the individual virtual content items. The content data can identify virtual content items that are owned by a profile corresponding to the second user (e.g., user 106B) and/or content that other users (e.g., user 106A and/or user 106C) have shared with the second user (e.g., user 106B).

Block 606 illustrates sending rendering data to the device (e.g., device 108B). The content management module 120 and/or positioning module 124 can send the rendering data to the second device (e.g., device 108B). As described above, rendering data may include instructions for rendering a graphical representation of a virtual content item via a display of a device (e.g., device 108A). For instance, the rendering data may include instructions describing the geometry, viewpoint, texture, lighting, shading, etc. associated with a virtual content item.

Block 608 illustrates causing virtual content to be rendered via the device (e.g., device 108B). The second device (e.g., device 108B) can leverage the rendering data to render virtual content items in the mixed reality environment associated with the second user (e.g., user 106B) via the rendering module 132 associated with the second device (e.g., device 108B). As described above, the second user (e.g., user 106B) can modify the permissions (e.g., visibility, interactivity, etc.) of any of the virtual content items that he or she owns. That is, the second user (e.g., user 106B) can determine who he or she desires to share the virtual content items with and/or permissions the other users (e.g., user 106A and/or user 106C) have with respect to interacting with the virtual content items. However, the second user (e.g., user 106B) cannot modify the permissions of any of the virtual content items that he or she does not own. The second user (e.g., user 106B) can interact with individual virtual content items until the owner of each of the virtual content items makes a virtual content item private such that the second user (e.g., user 106B) cannot view the virtual content item.

Figure 7:
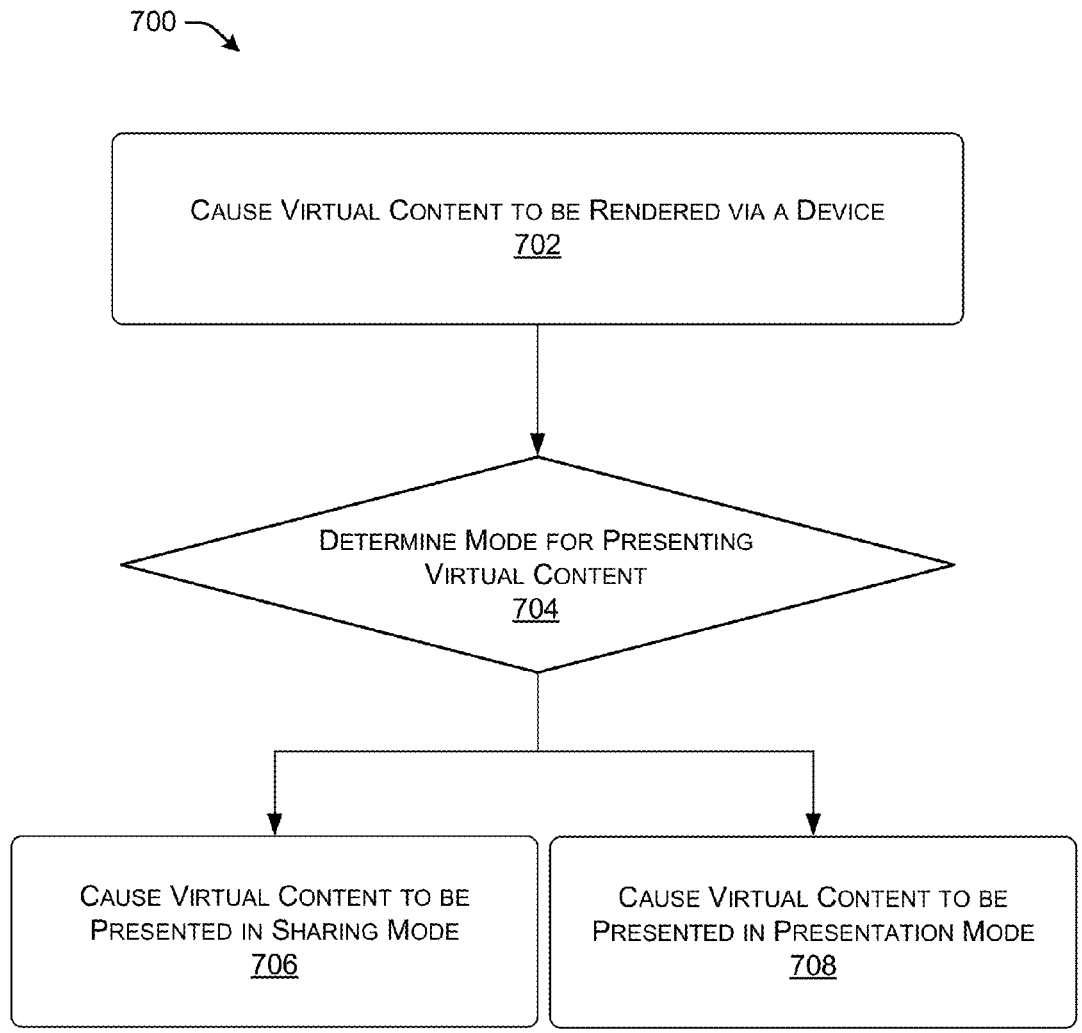
FIG. 7 is a flow diagram that illustrates an example process to cause virtual content to be presented in the mixed reality environment in different modes (e.g., presenter mode or sharing mode).

FIG. 7 is a flow diagram that illustrates an example process 700 to cause virtual content to be presented in the mixed reality environment in different modes (e.g., presenter mode or sharing mode).

Block 702 illustrates causing virtual content to be rendered via a device (e.g., device 108A, device 108B, and/or device 108C). As described above, the rendering module 132 associated with the device (e.g., device 108A, device 108B, and/or device 108C) can render virtual content items corresponding to the rendering data in the mixed reality environment associated with the user (e.g., user 106A, user 106B, and/or user 106C).

Block 704 illustrates determining a mode for presenting the virtual content. In some examples, the content management module 120 can determine whether a user (e.g., user 106A) desires to present the virtual content in a sharing mode, whereby other users (e.g., user 106B and/or user 106C) can view virtual content items that the user (e.g., user 106A) shared with them via an enhanced user interface such that the virtual content items augment the real scene where the other users (e.g., user 106B and/or user 106C) are physically located within the spatial region, or a presentation mode. The presentation mode can enable the user (e.g., user 106A) to share all of the virtual content that the user (e.g., user 106A) has open (i.e., is visible on the user's (e.g., user 106A) display 204) with the other users (e.g., user 106B and/or user 106C). In such an example, the user (e.g., user 106A) can share menus, wands, virtual content items, etc. That is, the presentation mode can enable the user (e.g., user 106A) to share all of the content he or she has open with all of the other users (e.g., user 106B and/or user 106C) (i.e., make all virtual content items public) and share menus that the user (e.g., user 106A) generally can see in his or her first person view.

Block 706 illustrates causing the virtual content to be presented in sharing mode. As described above, the owner of a virtual content item can determine who he or she wants to share the virtual content item with. In at least one example, the owner of the virtual content item can interact with a virtual menu presented to the user (e.g., user 106B) in the mixed reality environment. As described above, the virtual menu can include graphical representations of sharing settings, such as, but not limited to, private, public, etc. The virtual menu can be a drop down menu, a radial menu, etc. The virtual menu can provide the user (e.g., user 106B) with controls for indicating whether the user (e.g., user 106B) desires to make the virtual content item private or public, as described above. If the user (e.g., user 106B) desires to keep the virtual content item private, no other users (e.g., user 106A and/or user 106C) can see the virtual content item. If the user (e.g., user 106B) desires to make the virtual content item public, all of the other users (e.g., user 106A and/or user 106C) can see the virtual content item. In some examples, the user (e.g., user 106B) can specify one or more users (i.e., less than all users) with whom he or she desires to share the virtual content item. This permissions data can be provided to the content database 118 for storing with the content data. Accordingly, based at least in part on accessing, receiving, and/or determining authentication data, the content management module 120 and/or the positioning module 124 can access content data including permissions data indicating which users 106 have permission to view and/or interact with individual content data items. The other devices (e.g., device 108A and/or device 108C) can render virtual content items based at least in part on receiving rendering data from the content management module 120 and/or the positioning module 124. The other users (e.g., user 106A and/or user 106C) can view the rendered virtual content items in their own first person perspective.

Block 708 illustrates causing the virtual content to be presented in presentation mode. In other examples, the content management module 120 can determine that a user (e.g., user 106B) desires to share his or her mixed reality environment with other users (e.g., user 106A and/or user 106C) in a presenter mode. Accordingly, the content management module 120 and/or the positioning module 124 can send rendering data to devices associated with the other users (e.g., device 108A and/or device 108C) such that the corresponding rendering modules 132 can render virtual content consistent with the virtual content presented in the user's (e.g., user 106B) mixed reality environment. The presenter mode enables the user (e.g., user 106B) to show other users (e.g., user 106A and/or user 106C) how to use an application or give a demonstration of the system. Presenter mode is similar to various desktop sharing functionalities. The other users (e.g., user 106A and/or user 106C) can see the user's (e.g., user 106B) mixed reality environment from their own first person perspective. In at least one example, the other users (e.g., user 106A and/or user 106C) can see their private mixed reality environment in addition to the mixed reality environment of the user (e.g., user 106B).

Service Provider/Server: Example Architecture and Processes

Figure 8:
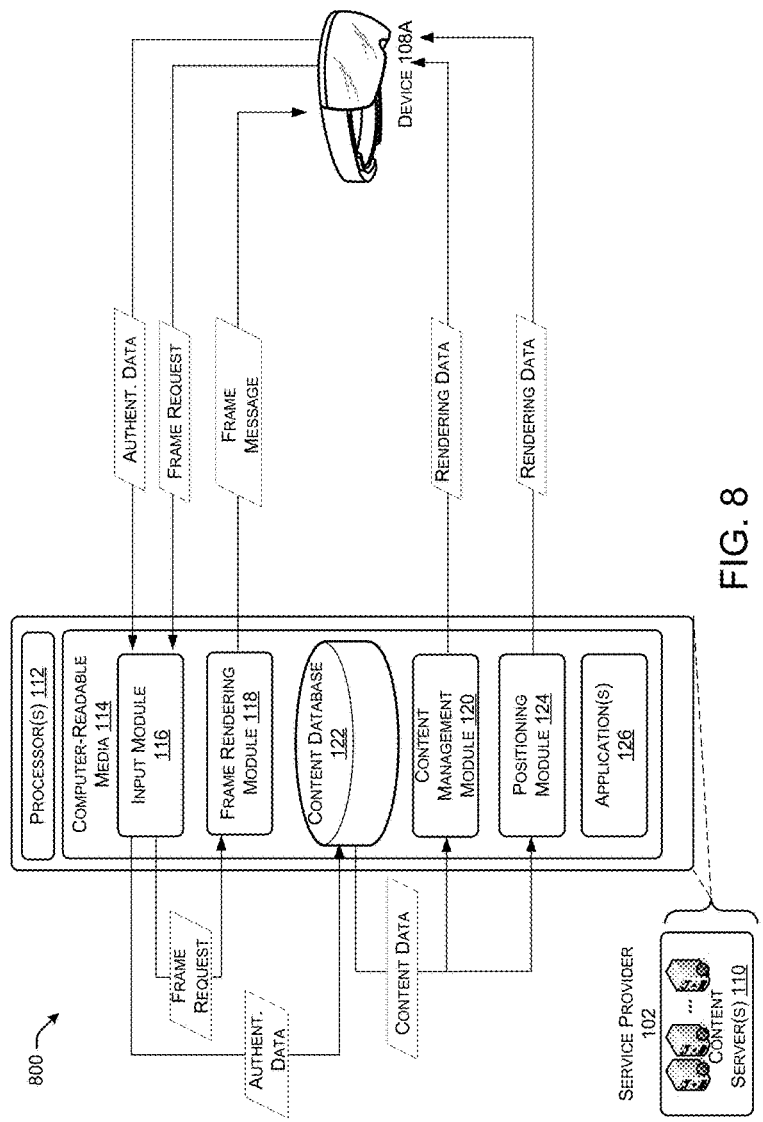
FIG. 8 is a schematic diagram showing an example environment for enabling two or more users in a mixed reality environment to interact with one another and/or with virtual content that is presented in the mixed reality environment.

FIG. 8 is a schematic diagram showing an example environment 800 for enabling two or more users (e.g., user 106A, user 106B, and/or user 106C) in a mixed reality environment to interact with one another and/or with virtual content that is presented in the mixed reality environment. In FIG. 8, the service provider 102 serves a server role and is responsible for synchronizing communication and/or virtual content rendering by the devices (e.g., device 108A, device 108B, and/or device 108C). The devices (e.g., devices 108A, device 108B, and/or device 108C) can run an application 134 locally and receive frame messages and/or frames for presenting the virtual content.

FIG. 8 illustrates a device (e.g., device 108A) sending authentication data to the service provider 102. The authentication data can correspond to a user identification and password associated with the user (e.g., user 106A), biometric identification associated with the user (e.g., user 106A), etc. The authentication data can be utilized to determine a presence of the device (e.g., device 108A), visual content that is available to the user (e.g., user 106A), and the user's (e.g., user 106A) permissions corresponding to whether the user (e.g., user 106A) can view and/or interact with the virtual content, as described above.

Additionally, the device (e.g., device 108A) can send frame request messages in real time, as described above. The frame rendering module 122 can be configured to generate frame messages responsive to the frame requests, as described above. The frame rendering module 122 can send frame messages directly to devices 108.

Based at least in part on receiving the authentication data, the content management module 120 and/or the positioning module 124 can access content data from the content database 118. As described above, individual virtual content items can be associated with data in the content database 118 indicating an owner identification, a content identification, and permissions associated with the individual virtual content items.

Unlike the example environment 500, in this example, the service provider 102 cannot simply send content data to the device (e.g., device 108A) and the device (e.g., device 108A) cannot simply render the virtual content in screenspace as the presentation of the virtual content can be affected by noticeable latency (e.g., movement of a user (e.g., user 106A) and/or device (e.g., device 108A) that happened before a frame is rendered on the device (e.g., device 108A)). Instead, in at least one example, the rendering module 132, stored locally on the device (e.g., device 108A), can utilize the frame messages for rendering and/or presenting the virtual content via the device (e.g., device 108A), as described above.

The process described in FIG. 9 below is illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. The example process is described in the context of the environment 800 of FIG. 8 but is not limited to that environment.

Figure 9:
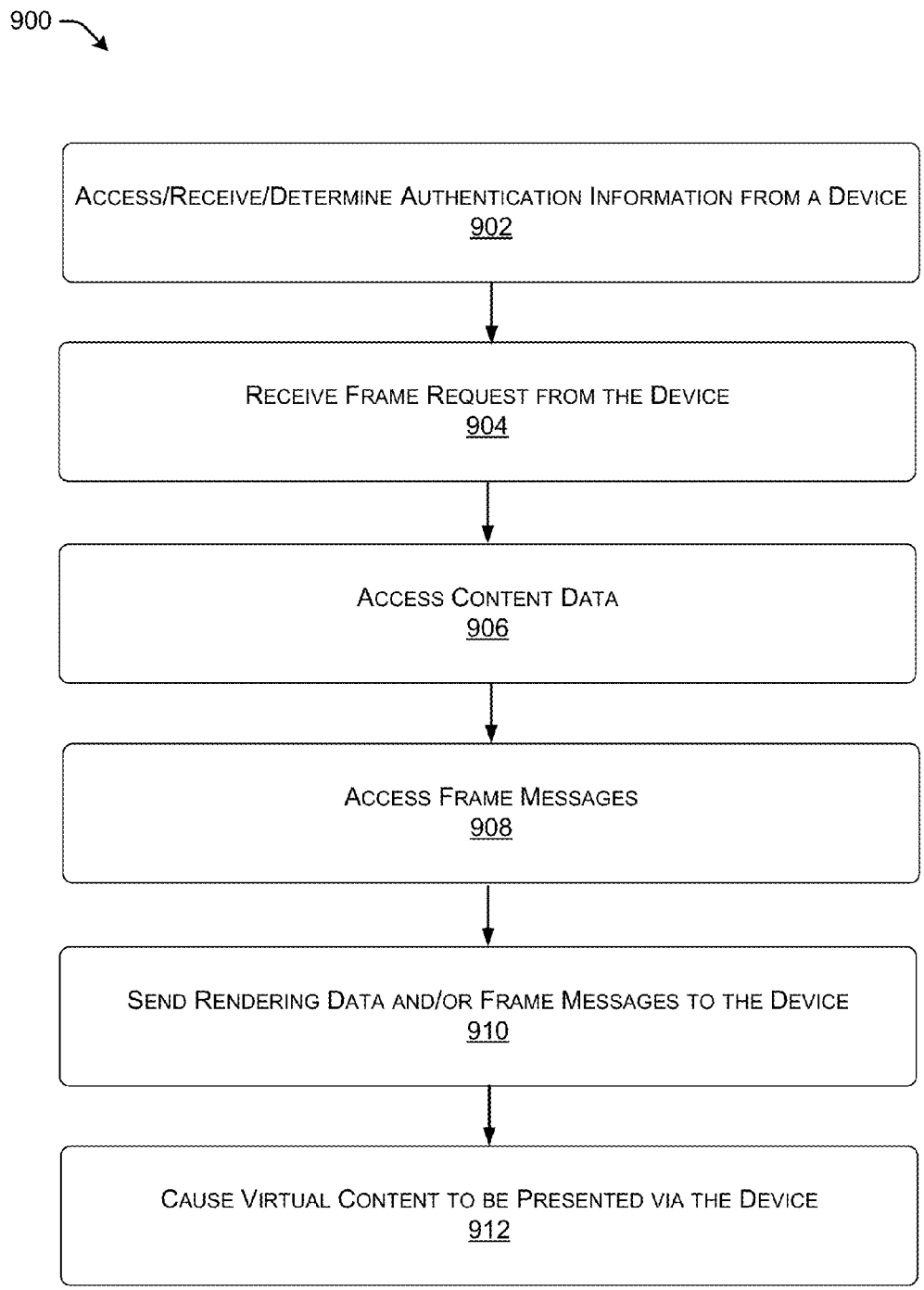
FIG. 9 is a flow diagram that illustrates an example process to cause virtual content to be presented in the mixed reality environment.

FIG. 9 is a flow diagram that illustrates an example process 900 to cause virtual content to be presented in the mixed reality environment.

Block 902 illustrates accessing, receiving, and/or determining authentication information from a device (e.g., device 108A). As illustrated in FIG. 8, the input module 116 can access, receive, and/or determine authentication data from a device (e.g., device 108A). The authentication data can correspond to a user identification and password associated with the user (e.g., user 106A), biometric identification associated with the user (e.g., user 106A), etc. The authentication data can be utilized to determine a presence of a device (e.g., device 108A), visual content that is available to the user (e.g., user 106A) corresponding to the device (e.g., device 108A), and the user's (e.g., user 106A) permissions corresponding to whether the user (e.g., user 106A) can view and/or interact with the virtual content, as described above.

Block 904 illustrates receiving a frame request from the device (e.g., device 108B). The frame rendering module 122 can receive frame request messages from the device (e.g., device 108A), as described above.

Block 906 illustrates accessing content data. Based at least in part on receiving the authentication data, the content management module 120 and/or the positioning module 124 can access content data from the content database 118. As described above, content data can be stored in the content database 118 indicating an owner identification, a content identification, and permissions associated with the individual virtual content items.

Block 908 illustrates accessing frame messages. The frame rendering module 122 can be configured to output frame messages and send the frame messages directly to devices 108, as described above.

Block 910 illustrates sending rendering data and/or frame messages to the device (e.g., device 108A). In some examples, the rendering module 132 can receive previously rendered frames associated with frame messages from the service provider 102 to correct for potential latency and/or render correct perspectives based on the position of the user (e.g., user 106A) in worldspace. In other examples, the rendering module 132 may receive rendering data for rendering the virtual content items locally.

Block 912 illustrates causing virtual content to be presented via the device (e.g., device 108A). The device (e.g., device 108A) can render virtual content items corresponding to rendering data in the mixed reality environment associated with the user (e.g., user 106A) via the rendering module 132 associated with the device (e.g., device 108A). As described above, in some instances, the service provider 102 may be unable to send rendering data to the device (e.g., device 108A) and the device (e.g., device 108A) may be unable to render the virtual content in screenspace as the presentation of the virtual content can be affected by noticeable latency. Instead, in at least one example, the rendering module 132, stored locally on the device (e.g., device 108A), can leverage the frame messages to cause the virtual content items to be presented via the device (e.g., device 108A), as described above.

Modifying Visibility and Interacting with Virtual Content Items

Figure 10:
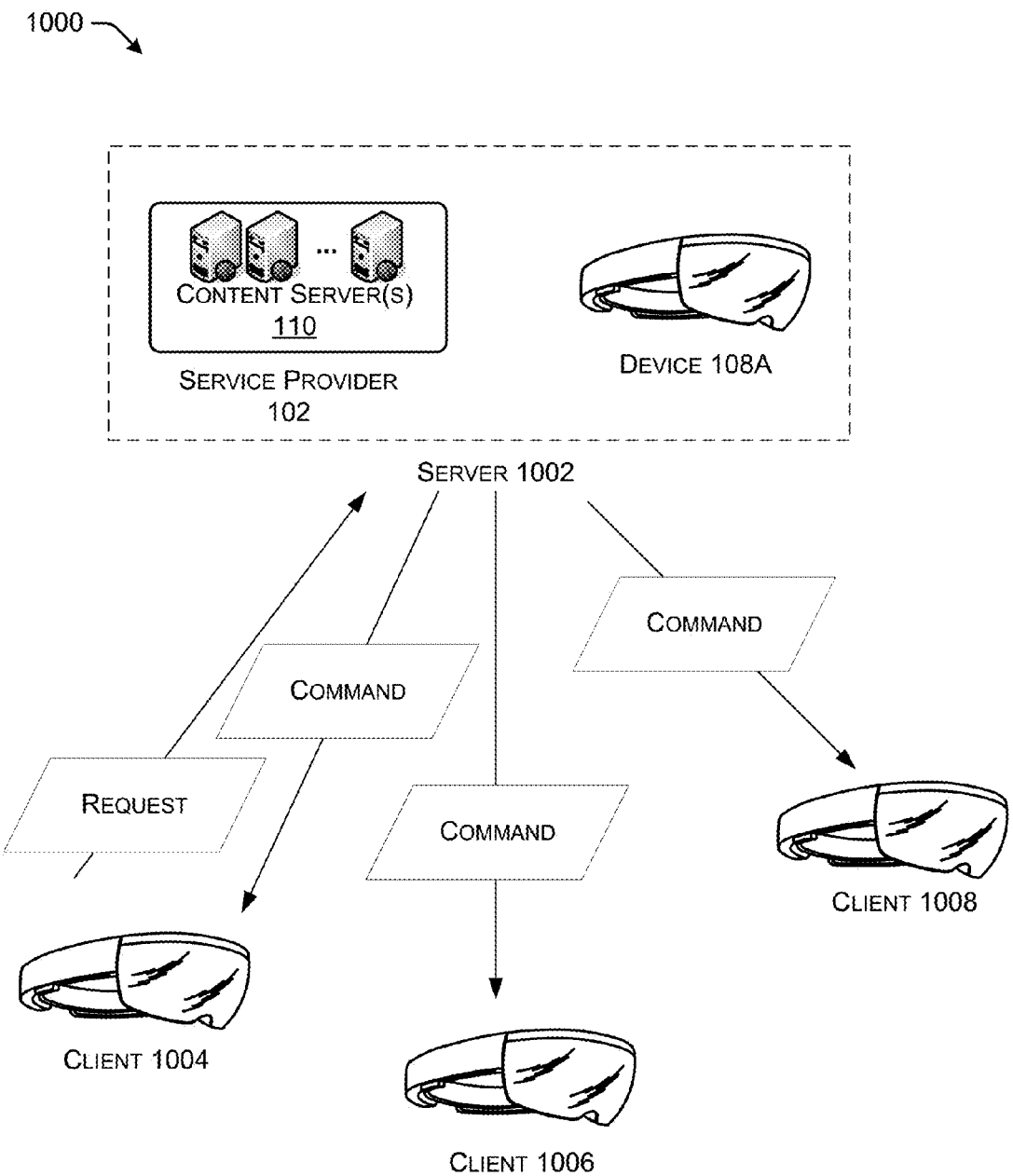
FIG. 10 is a schematic diagram showing an example environment for enabling two or more users in a mixed reality environment to interact with one another and/or with virtual content that is presented in the mixed reality environment.

FIG. 10 is a schematic diagram showing an example environment 1000 for enabling two or more users (e.g., user 106A, user 106B, and/or user 106C) in a mixed reality environment to interact with one another and/or with virtual content that is presented in the mixed reality environment. In the example environment 1000, a server 1002 can send and receive data to one or more client devices (e.g., client 1004, client 1006, and/or client 1008). The server 1002 can be the service provider 102 or a device (e.g., device 108A). Each of the client devices (e.g., client 1004, client 1006, and/or client 1008) can correspond to device 108A, 108B, and/or 108C. The one or more client devices (e.g., client 1004, client 1006, and/or client 1008) can send requests and receive data associated with commands for rendering and/or interacting with virtual content. The server 1002 can manage the requests and commands to synchronize communication and/or virtual content rendering between the one or more client devices (e.g., client 1004, client 1006, and/or client 1008) and to support security, syncing of variables (e.g., state variables), managing timing (e.g., animation timing, etc.), etc.

The processes described in FIGS. 11 and 12 below are illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. The example process is described in the context of the environment 1000 of FIG. 10 but is not limited to that environment.

FIG. 11 is a flow diagram that illustrates an example process 1100 to cause the visibility of virtual content to be modified in the mixed reality environment.

Block 1102 illustrates receiving, from a first client device (e.g., client 1004), a request to share a virtual content item with one or more other client devices (e.g., client 1006 and/or client 1008). In this example, the first client device (e.g., client 1004) can be the owner of the virtual content item and can determine who to share the virtual content item with and/or when to make the virtual content item private.

Block 1104 illustrates sending a command to one or more other client devices (e.g., client 1006 and/or client 1008). The server 1002 can send the command to the one or more other client devices (e.g., client 1006 and/or client 1008). The command can include rendering data and, in some examples, frame messages for rendering by the one or more other client devices (e.g., client 1006 and/or client 1008), as described above.

Block 1106 illustrates causing the virtual content item to be presented via the one or more other client devices (e.g., client 1006 and/or client 1008). As described above, the rendering module 132 associated with the individual client devices (e.g., client 1006 and/or client 1008) can render the virtual content item in the mixed reality environment. The users (e.g., user 106A and/or user 106B) corresponding to the one or more other client devices (e.g., client 1006 and/or client 1008) can interact with the virtual content item as long as the first client device (e.g., client 1002) continues to share the virtual content item with the one or more other client devices (e.g., client 1006 and/or client 1008). In some examples, the one or more client devices (e.g., client 1006 and/or client 1008) may receive previously rendered frames via frame messages and may present the virtual content item based at least in part on presenting the previously rendered frames.

The first client device (e.g., client 1004) can request to make the virtual content item private via a process similar to example process 1100. The first client device (e.g., client 1004) can request to make a virtual content item private with respect to one or more other client devices (e.g., client 1006 and/or client 1008). The server 1002 can send a command to one or more other client devices (e.g., client 1006 and/or client 1008). The command can include data indicating that the virtual content item is no longer visible with respect to one or more of the other client devices (e.g., client 1006 and/or client 1008), as described above. Accordingly, the rendering module 132 associated with the individual client devices (e.g., client 1006 and/or client 1008) can terminate rendering the virtual content item in the mixed reality environment.

In some examples, based at least in part on any one of the client devices (e.g., client 1004, client 1006, and/or client 1008) accessing a virtual content item, the server 1002 can send data associated with a virtual content item to each of the other client devices (e.g., client 1004, client 1006, and/or client 1008). The data can instruct all of the client devices (e.g., client 1004, client 1006, and/or client 1008) (i.e., the rendering module 132 associated with all of the client devices) to create and load the virtual content item. However, the client devices (e.g., client 1004, client 1006, and/or client 1008) can hide the virtual content item until the client devices (e.g., client 1004, client 1006, and/or client 1008) receive data indicating that owner of the virtual content item shared the virtual content item with the client devices (e.g., client 1004, client 1006, and/or client 1008). The owner of the virtual content item can send a request to share the virtual content item with one or more of the other client devices (e.g., client 1004, client 1006, and/or client 1008) and the server 1002 can send a command to the one or more client devices (e.g., client 1004, client 1006, and/or client 1008) so that the one or more client devices (e.g., client 1004, client 1006, and/or client 1008) can render the virtual content item. The command may be associated with rendering data and/or frame messages, as described above.

Figure 12:
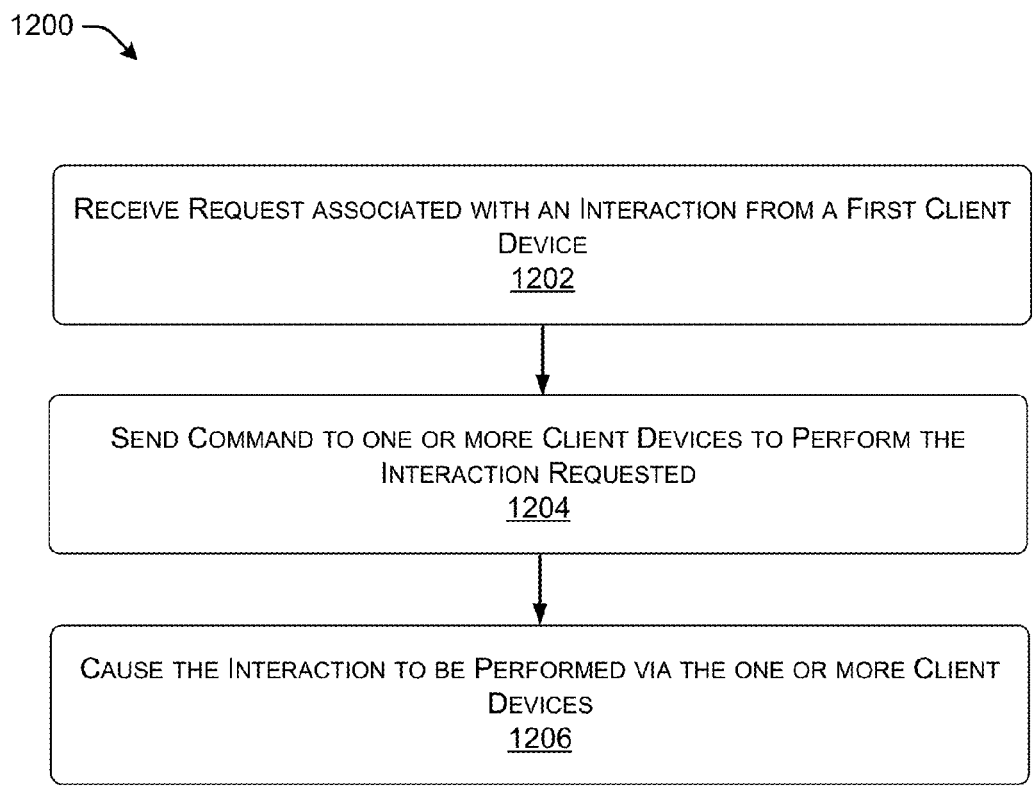
FIG. 12 is a flow diagram that illustrates an example process to cause an interaction associated with the virtual content to be performed via one or more devices in a mixed reality environment.

FIG. 12 is a flow diagram that illustrates an example process 1200 to cause an interaction with a virtual content item to be performed via one or more client devices (e.g., client 1004, client 1006, and/or client 1008) in the mixed reality environment.

Block 1202 illustrates receiving, from a first client device (e.g., client 1004), a request to interact with a virtual content item. For instance, the first client device (e.g., client 1004) can desire to move the virtual content item, cause the virtual item to rotate, etc. Block 1204 illustrates sending a command to all of the client devices (e.g., client 1004, client 1006 and/or client 1008) that have permission to view the virtual content item to perform the interaction requested. The server 1002 can send the command to the client devices (e.g., client 1004, client 1006, and/or client 1008) that have permission to view the virtual content item. The command can include rendering data, data associated with the interaction, and, in some examples, frame messages for rendering by the client devices (e.g., client 1004, client 1006, and/or client 1008), as described above. Block 1206 illustrates causing the interaction to be performed on the virtual content item via the client devices (e.g., client 1004, client 1006, and/or client 1008). As described above, the rendering module 132 associated with the individual client devices (e.g., client 1004, client 1006, and/or client 1008) can render the virtual content item in the mixed reality environment and can modify the virtual content item based on the interaction requested. The users (e.g., user 106A, user 106B, and/or user 106C) corresponding to the client devices (e.g., client 1004, client 1006, and/or client 1008) can interact with the virtual content item as long as the first client device (e.g., client 1004) continues to share the virtual content item with the one or more other client devices (e.g., client 1006 and/or client 1008).

Example Clauses

A. A system comprising: a mixed reality display device; and a device communicatively coupled to the mixed reality display device, the device comprising: one or more processors; memory; and one or more modules stored in the memory and executable by the one or more processors to perform operations comprising: determining a presence of the mixed reality display device based at least in part on authentication information associated with the mixed reality display device; determining visibility of a plurality of content items for the mixed reality display device based at least in part on: accessing content data associated with the plurality of content items, the content data indicating an identification of individual content items of the plurality of content items, an owner of each of the individual content items, and permissions associated with each of the individual content items; determining, based at least in part on the authentication information and the content data, a content item of the plurality of content items that is at least one of owned by the mixed reality display device or has been shared with the mixed reality display device; and causing a graphical representation of the content item to be presented via a display on the mixed reality display device.

B. The system as paragraph A recites, the operations further comprising: sending rendering data associated with the content item to the mixed reality display device; and causing the graphical representation of the content item to be rendered via the mixed reality display device.

C. The system as paragraph B recites, the operations further comprising, prior to causing the graphical representation of the content item to be rendered via the display, receiving a frame request from the mixed reality display device, the frame request including at least one of pose information associated with each eye of a user associated with the mixed reality display device, a time stamp, a desired resolution, or a desired field of view.

D. The system as paragraph C recites, the operations further comprising: determining a frame message corresponding to the frame request, the frame message including at least one of the pose information associated with each eye of the user, the time stamp, a determined resolution, a determined field of view, or a render distance; sending the frame message to the mixed reality display device; and causing the graphical representation of the content item to be rendered via the display based at least in part on the frame message.

E. The system as paragraph D recites, wherein the frame message further includes rendered stereo images for each eye of the user.

F. The system as any of paragraphs A-E recite, wherein the permissions indicate a plurality of devices with which the content item has been shared.

G. The system as any of paragraphs A-F recite, wherein the permissions indicate interactions that are available for the content item and a plurality of devices permitted to cause the interactions.

H. A mixed reality display device comprising: one or more processors; memory; and one or more modules stored in the memory and executable by the one or more processors to perform operations comprising: determining authentication information associated with a second mixed reality display device; determining that a content item of a plurality of content items is visible in a mixed reality environment associated with the second mixed reality display device based at least in part on: accessing content data associated with the plurality of content items, the content data indicating an identification of the content item, an owner of the content item, and permissions associated with the content item; and determining, based at least in part on the authentication information and the content data, that the content item is at least one of owned by the second mixed reality display device or has been shared with the second mixed reality display device; and causing a graphical representation of the content item to be rendered via a display on the second mixed reality display device.

I. The mixed reality display device as paragraph H recites, the operations further comprising: determining, based at least in part on the content data, that the content item is owned by the mixed reality display device; determining that the content item has been made private; and terminating the causing of the graphical representation of the content item to be rendered via the display of the second mixed reality display device.

J. The mixed reality display device as paragraph I recites, the operations further comprising: causing a menu with graphical representations of sharing settings to be presented via the mixed reality display device, the sharing settings including a private sharing setting or a public sharing setting; determining selection of the private sharing setting; and determining that the content item has been made private based at least in part on the selection of the private sharing setting.

K. The mixed reality display device as any of paragraphs H-J recite, the operations further comprising: determining, based at least in part on the content data, that the second mixed reality display device is not the owner of the content item; determining that the content item is no longer being shared with the second mixed reality display device; and terminating the causing of the graphical representation of the content item to be rendered via the display on the second mixed reality display device.

L. The mixed reality display device as paragraph K recites, wherein: determining that the content item is visible is further based at least in part on sharing settings associated with the content item; and the operations further comprise: determining, based at least in part on the content data, that a third mixed reality display device is the owner of the content item; receiving a request from the third mixed reality display device to make the content item private; changing the sharing settings based at least in part on the request; and determining that the content item is no longer being shared with the second mixed reality display device based at least in part on changes to the sharing settings.

M. The mixed reality display device as any of paragraphs H-L recite, the operations further comprising: determining authentication information associated with a third mixed reality display device; determining, based at least in part on the authentication information associated with the third mixed reality display device and the content data, that the content item is not owned by the third mixed reality display device and has not been shared with the third mixed reality display device; and prohibiting the graphical representation of the content item from being rendered via a display on the third mixed reality display device.

N. The mixed reality display device as any of paragraphs H-M recite, the operations further comprising: receiving, from the owner of the content item, a request to share the content item with at least one additional mixed reality display device; sending rendering data to the at least one additional mixed reality display device; and causing the graphical representation of the content item to be rendered via a display on the at least one additional mixed reality display device.

O. A method for managing permissions of a plurality of content items associated with mixed reality display devices, the method comprising: determining authentication information associated with a first mixed reality display device of the mixed reality display devices; receiving, from the first mixed reality display device, a first request to share a content item of the plurality of content items with one or more second mixed reality display devices of the mixed reality display devices; accessing content data associated with the plurality of content items, the content data indicating at least one of an identification of individual content items of the plurality of content items, an owner of each of the individual content items, or permissions associated with each of the individual content items; determining, based at least in part on the authentication information and the content data, that the first mixed reality display device has permission to share the content item; and causing a graphical representation of the content item to be presented via the one or more second mixed reality display devices.

P. The method as paragraph O recites, further comprising: receiving, from a second mixed reality display device of the one or more second mixed reality display devices, a second request associated with an interaction affecting the content item; determining, based at least in part on the content data, that the second mixed reality display device is permitted to interact with the content item via the interaction; and sending a command to the first mixed reality display device and other mixed reality display devices of the one or more second mixed reality display devices to perform the interaction.

Q. The method as paragraphs O or P recite, further comprising receiving, from a requesting device comprising at least one of the first mixed reality display device or a second mixed reality display device of the one or more second mixed reality display devices, a frame request including at least one of pose information associated with each eye of a user corresponding to the requesting device, a time stamp, a desired resolution, or a desired field of view.

R. The method as paragraph Q recites, further comprising: determining a frame message corresponding to the frame request, the frame message including at least one of the pose information associated with each eye of the user, the time stamp, a determined resolution, a determined field of view, or a render distance; sending the frame message to the requesting device; and causing the graphical representation of the content item to be presented via the first mixed reality display device and the one or more second mixed reality display devices based at least in part on the frame message.

S. The method as paragraphs O-R recite, further comprising: sending at least one of rendering data or rendered stereo images to the first mixed reality display device and the one or more second mixed reality display devices; and causing the graphical representation of the content item to be presented via the first mixed reality display device and the one or more second mixed reality display devices based at least in part on at least one of the rendering data or the rendered stereo images.

T. The method as paragraphs O-S recite, further comprising: receiving, from the first mixed reality display device, a second request to share a mixed reality environment associated with the first mixed reality display device with the one or more second mixed reality display devices, the mixed reality environment including the content item and one or more additional content items; and causing the mixed reality environment to be presented via the one or more second mixed reality display devices to enable a presenter mode.

U. The method as paragraphs O-T recite, wherein the permissions indicate a plurality of devices with which the content item has been shared.

V. The method as paragraphs O-U recite, wherein the permissions indicate interactions that are available for the content item and a plurality of devices permitted to cause the interactions.

W. One or more computer-readable media encoded with instructions that, when executed by a processor, configure a computer to perform a method as any of paragraphs O-V recite.

X. A device comprising one or more processors and one or more computer readable media encoded with instructions that, when executed by the one or more processors, configure a computer to perform a computer-implemented method as any of paragraphs O-V recite.

Y. A method for managing permissions of a plurality of content items associated with mixed reality display devices, the method comprising: means for determining authentication information associated with a first mixed reality display device of the mixed reality display devices; means for receiving, from the first mixed reality display device, a first request to share a content item of the plurality of content items with one or more second mixed reality display devices of the mixed reality display devices; means for accessing content data associated with the plurality of content items, the content data indicating at least one of an identification of individual content items of the plurality of content items, an owner of each of the individual content items, or permissions associated with each of the individual content items; means for determining, based at least in part on the authentication information and the content data, that the first mixed reality display device has permission to share the content item; and means for causing a graphical representation of the content item to be presented via the one or more second mixed reality display devices.

Z. The method as paragraph Y recites, further comprising: means for receiving, from a second mixed reality display device of the one or more second mixed reality display devices, a second request associated with an interaction affecting the content item; means for determining, based at least in part on the content data, that the second mixed reality display device is permitted to interact with the content item via the interaction; and means for sending a command to the first mixed reality display device and other mixed reality display devices of the one or more second mixed reality display devices to perform the interaction.

AA. The method as paragraphs Y or Z recite, further comprising means for receiving, from a requesting device comprising at least one of the first mixed reality display device or a second mixed reality display device of the one or more second mixed reality display devices, a frame request including at least one of pose information associated with each eye of a user corresponding to the requesting device, a time stamp, a desired resolution, or a desired field of view.

AB. The method as paragraph AA recites, further comprising: means for determining a frame message corresponding to the frame request, the frame message including at least one of the pose information associated with each eye of the user, the time stamp, a determined resolution, a determined field of view, or a render distance; means for sending the frame message to the requesting device; and means for causing the graphical representation of the content item to be presented via the first mixed reality display device and the one or more second mixed reality display devices based at least in part on the frame message.

AC. The method as paragraphs Y-AB recite, further comprising: means for sending at least one of rendering data or rendered stereo images to the first mixed reality display device and the one or more second mixed reality display devices; and means for causing the graphical representation of the content item to be presented via the first mixed reality display device and the one or more second mixed reality display devices based at least in part on at least one of the rendering data or the rendered stereo images.

AD. The method as paragraphs Y-AC recite, further comprising: means for receiving, from the first mixed reality display device, a second request to share a mixed reality environment associated with the first mixed reality display device with the one or more second mixed reality display devices, the mixed reality environment including the content item and one or more additional content items; and means for causing the mixed reality environment to be presented via the one or more second mixed reality display devices to enable a presenter mode.

AE. The method as paragraphs Y-AD recite, wherein the permissions indicate a plurality of devices with which the content item has been shared.

AF. The method as paragraphs Y-AE recite, wherein the permissions indicate interactions that are available for the content item and a plurality of devices permitted to cause the interactions.

Conclusion

Although the subject matter has been described in language specific to structural features and/or methodological acts, it is to be understood that the subject matter defined in the appended claims is not necessarily limited to the specific features or acts described. Rather, the specific features and acts are described as illustrative forms of implementing the claims.

Conditional language such as, among others, "can," "could," "might" or "can," unless specifically stated otherwise, are understood within the context to present that certain examples include, while other examples do not necessarily include, certain features, elements and/or steps. Thus, such conditional language is not generally intended to imply that certain features, elements and/or steps are in any way required for one or more examples or that one or more examples necessarily include logic for deciding, with or without input or prompting, whether certain features, elements and/or steps are included or are to be performed in any particular example. Conjunctive language such as the phrase "at least one of X, Y or Z," unless specifically stated otherwise, is to be understood to present that an item, term, etc. can be either X, Y, or Z, or a combination thereof.

What is claimed:

1. A system comprising:
a mixed reality display device; and
a device communicatively coupled to the mixed reality display device, the device comprising:
one or more processors;
memory; and
one or more modules stored in the memory and executable by the one or more processors to perform operations comprising:
determining a presence of the mixed reality display device based at least in part on authentication information associated with the mixed reality display device;

determining visibility of a plurality of content items for the mixed reality display device based at least in part on:
  accessing content data associated with the plurality of content items, the content data indicating an identification of individual content items of the plurality of content items, an owner of each of the individual content items, and permissions associated with each of the individual content items;
  determining, based at least in part on the authentication information and the content data, a content item of the plurality of content items that is at least one of owned by the mixed reality display device or has been shared with the mixed reality display device; and
  causing a graphical representation of the content item to be presented via a display on the mixed reality display device.

2. The system as claim 1 recites, the operations further comprising:
  sending rendering data associated with the content item to the mixed reality display device; and
  causing the graphical representation of the content item to be rendered via the mixed reality display device.

3. The system as claim 2 recites, the operations further comprising, prior to causing the graphical representation of the content item to be rendered via the display, receiving a frame request from the mixed reality display device, the frame request including at least one of pose information associated with each eye of a user associated with the mixed reality display device, a time stamp, a desired resolution, or a desired field of view.

4. The system as claim 3 recites, the operations further comprising:
  determining a frame message corresponding to the frame request, the frame message including at least one of the pose information associated with each eye of the user, the time stamp, a determined resolution, a determined field of view, or a render distance;
  sending the frame message to the mixed reality display device; and
  causing the graphical representation of the content item to be rendered via the display based at least in part on the frame message.

5. The system as claim 4 recites, wherein the frame message further includes rendered stereo images for each eye of the user.

6. The system as claim 1 recites, wherein the permissions indicate a plurality of devices with which the content item has been shared.

7. The system as claim 1 recites, wherein the permissions indicate interactions that are available for the content item and a plurality of devices permitted to cause the interactions.

8. A mixed reality display device comprising:
  one or more processors;
  memory; and
  one or more modules stored in the memory and executable by the one or more processors to perform operations comprising:
    determining authentication information associated with a second mixed reality display device;
    determining that a content item of a plurality of content items is visible in a mixed reality environment associated with the second mixed reality display device based at least in part on:
      accessing content data associated with the plurality of content items, the content data indicating an identification of the content item, an owner of the content item, and permissions associated with the content item; and
      determining, based at least in part on the authentication information and the content data, that the content item is at least one of owned by the second mixed reality display device or has been shared with the second mixed reality display device; and
    causing a graphical representation of the content item to be rendered via a display on the second mixed reality display device.

9. The mixed reality display device as claim 8 recites, the operations further comprising:
  determining, based at least in part on the content data, that the content item is owned by the mixed reality display device;
  determining that the content item has been made private; and
  terminating the causing of the graphical representation of the content item to be rendered via the display of the second mixed reality display device.

10. The mixed reality display device as claim 9 recites, the operations further comprising:
  causing a menu with graphical representations of sharing settings to be presented via the mixed reality display device, the sharing settings including a private sharing setting or a public sharing setting;
  determining selection of the private sharing setting; and
  determining that the content item has been made private based at least in part on the selection of the private sharing setting.

11. The mixed reality display device as claim 8 recites, the operations further comprising:
  determining, based at least in part on the content data, that the second mixed reality display device is not the owner of the content item;
  determining that the content item is no longer being shared with the second mixed reality display device; and
  terminating the causing of the graphical representation of the content item to be rendered via the display on the second mixed reality display device.

12. The mixed reality display device as claim 11 recites, wherein:
  determining that the content item is visible is further based at least in part on sharing settings associated with the content item; and
  the operations further comprise:
    determining, based at least in part on the content data, that a third mixed reality display device is the owner of the content item;
    receiving a request from the third mixed reality display device to make the content item private;
    changing the sharing settings based at least in part on the request; and
    determining that the content item is no longer being shared with the second mixed reality display device based at least in part on changes to the sharing settings.

13. The mixed reality display device as claim 8 recites, the operations further comprising:
  determining authentication information associated with a third mixed reality display device;
  determining, based at least in part on the authentication information associated with the third mixed reality display device and the content data, that the content item is not owned by the third mixed reality display device and has not been shared with the third mixed reality display device; and prohibiting the graphical representation of the content item from being rendered via a display on the third mixed reality display device.

14. The mixed reality display device as claim 8 recites, the operations further comprising:

receiving, from the owner of the content item, a request to share the content item with at least one additional mixed reality display device;

sending rendering data to the at least one additional mixed reality display device; and causing the graphical representation of the content item to be rendered via a display on the at least one additional mixed reality display device.

15. A method comprising:

determining authentication information associated with a first mixed reality display device;

receiving, from the first mixed reality display device, a first request to share a content item of a plurality of content items with one or more second mixed reality display devices;

accessing content data associated with the plurality of content items, the content data indicating at least one of an identification of individual content items of the plurality of content items, an owner of each of the individual content items, or permissions associated with each of the individual content items;

determining, based at least in part on the authentication information and the content data, that the first mixed reality display device has permission to share the content item; and causing a graphical representation of the content item to be presented via the one or more second mixed reality display devices.

16. The method as claim 15 recites, further comprising:

receiving, from a second mixed reality display device of the one or more second mixed reality display devices, a second request associated with an interaction affecting the content item;

determining, based at least in part on the content data, that the second mixed reality display device is permitted to interact with the content item via the interaction; and sending a command to the first mixed reality display device and other mixed reality display devices of the one or more second mixed reality display devices to perform the interaction.

17. The method as claim 15 recites, further comprising receiving, from a requesting device comprising at least one of the first mixed reality display device or a second mixed reality display device of the one or more second mixed reality display devices, a frame request including at least one of pose information associated with each eye of a user corresponding to the requesting device, a time stamp, a desired resolution, or a desired field of view.

18. The method as claim 17 recites, further comprising:

determining a frame message corresponding to the frame request, the frame message including at least one of the pose information associated with each eye of the user, the time stamp, a determined resolution, a determined field of view, or a render distance;

sending the frame message to the requesting device; and causing the graphical representation of the content item to be presented via the first mixed reality display device and the one or more second mixed reality display devices based at least in part on the frame message.

19. The method as claim 15 recites, further comprising:

sending at least one of rendering data or rendered stereo images to the first mixed reality display device and the one or more second mixed reality display devices; and causing the graphical representation of the content item to be presented via the first mixed reality display device and the one or more second mixed reality display devices based at least in part on at least one of the rendering data or the rendered stereo images.

20. The method as claim 15 recites, further comprising:

receiving, from the first mixed reality display device, a second request to share a mixed reality environment associated with the first mixed reality display device with the one or more second mixed reality display devices, the mixed reality environment including the content item and one or more additional content items; and causing the mixed reality environment to be presented via the one or more second mixed reality display devices to enable a presenter mode.

* * * * *